United States Patent [19]
Duffy et al.

[11] Patent Number: 5,864,458
[45] Date of Patent: Jan. 26, 1999

[54] OVERCURRENT PROTECTION CIRCUITS COMPRISING COMBINATIONS OF PTC DEVICES AND SWITCHES

[75] Inventors: Hugh Duffy, Cupertino; Justin Chiang, Newark; John Midgley, San Carlos, all of Calif.

[73] Assignee: Raychem Corporation, Menlo Park, Calif.

[21] Appl. No.: 564,465

[22] Filed: Nov. 29, 1995

Related U.S. Application Data

[60] Provisional application No. 60/003,733 Sep. 14, 1995.

[51] Int. Cl.$^6$ ..................................................... H02H 3/00
[52] U.S. Cl. ........................... 361/93; 361/105; 361/106; 361/10
[58] Field of Search ................................. 361/10, 11, 26, 361/27, 103, 105, 106, 111, 57, 58, 93; 338/22 R, 23, 22 SD

[56] References Cited

U.S. PATENT DOCUMENTS

| | | | |
|---|---|---|---|
| 3,241,026 | 3/1966 | Andrich | 318/442 |
| 3,249,810 | 5/1966 | Strom et al. | 317/11 |
| 3,488,761 | 1/1970 | Ito et al. | 337/221 |
| 4,070,641 | 1/1978 | Khalid | 338/61 |
| 4,071,836 | 1/1978 | Cook et al. | 335/195 |
| 4,237,441 | 12/1980 | van Konynenburg et al. | 338/22 |
| 4,238,812 | 12/1980 | Middleman et al. | 361/106 |
| 4,315,237 | 2/1982 | Middleman et al. | 338/22 R |
| 4,317,027 | 2/1982 | Middleman et al. | 219/553 |
| 4,426,633 | 1/1984 | Taylor | 338/25 |
| 4,445,079 | 4/1984 | DeFilippis et al. | 318/792 |
| 4,485,283 | 11/1984 | Hurtle | 200/144 R |
| 4,545,926 | 10/1985 | Fouts et al. | 252/511 |
| 4,574,229 | 3/1986 | Kim | 361/27 |
| 4,583,146 | 4/1986 | Howell | 361/13 |
| 4,689,475 | 8/1987 | Kleiner et al. | 219/553 |
| 4,724,417 | 2/1988 | Au et al. | 338/22 R |

(List continued on next page.)

FOREIGN PATENT DOCUMENTS

| | | |
|---|---|---|
| 872089 | 3/1979 | Belgium . |
| 2019925 | 12/1990 | Canada . |
| 0 363 746 | 4/1990 | European Pat. Off. ......... H02H 3/08 |
| 0424283 | 4/1991 | European Pat. Off. . |
| 0 735 666 A2 | 2/1996 | European Pat. Off. .......... H02P 7/29 |
| 2 653 593 | 4/1991 | France ........................... H01H 51/08 |
| 2653593 | 4/1991 | France . |
| 2 042 935 | 8/1970 | Germany . |
| 24 43 522 | 1/1976 | Germany ......................... H02H 9/02 |
| 2928786 | 5/1981 | Germany . |
| 3544647 | 6/1987 | Germany . |
| 59-46730 | 3/1984 | Japan . |
| 59-49127 | 3/1984 | Japan . |
| 61-22719 | 1/1986 | Japan . |
| 61-22720 | 1/1986 | Japan . |
| 4-351825 | 12/1992 | Japan . |
| 5-6720 | 1/1993 | Japan . |
| 5-6723 | 1/1993 | Japan . |
| 5-6725 | 1/1993 | Japan . |
| 1172718 | 1/1988 | United Kingdom . |
| WO 93/07667 | 4/1993 | WIPO . |

OTHER PUBLICATIONS

*Technology for Detecting and Monitoring Conditions that Could Cause Electrical Wiring System Fires*, Underwriters Laboratories Inc., Sep. 1995.

Primary Examiner—Sally C. Medley
Attorney, Agent, or Firm—Timothy H. P. Richardson; Herbert G. Burkard

[57] ABSTRACT

Electrical circuit protection arrangements with PTC devices and mechanical switches. The combinations of this invention permit the use of mechanical switches and PTC devices to switch voltages and currents in normal circuit operations, wherein the voltage and/or current ratings of the mechanical switches and PTC devices are much less than the normal operating voltages and currents of the circuits. This feature permits the use of smaller and less expensive mechanical switches and PTC device than would otherwise be required in such circuits. The arrangements of switches and PTC devices also permit the PTC devices to limit the magnitude of the fault current passed to the circuit.

19 Claims, 9 Drawing Sheets

U.S. PATENT DOCUMENTS

| | | | |
|---|---|---|---|
| 4,724,504 | 2/1988 | Prouty | 361/165 |
| 4,774,024 | 9/1988 | Deep et al. | 252/511 |
| 4,780,598 | 10/1988 | Fahey et al. | 219/511 |
| 4,800,253 | 1/1989 | Kleiner et al. | 219/553 |
| 4,808,965 | 2/1989 | Cenky | 337/408 |
| 4,816,958 | 3/1989 | Beibel et al. | 361/93 |
| 4,845,838 | 7/1989 | Jacobs et al. | 29/671 |
| 4,857,880 | 8/1989 | Au et al. | 338/22 R |
| 4,859,836 | 8/1989 | Lunk et al. | 219/548 |
| 4,901,186 | 2/1990 | Tennant et al. | 361/106 |
| 4,907,340 | 3/1990 | Fang et al. | 29/610.1 |
| 4,910,631 | 3/1990 | Murphy | 361/96 |
| 4,924,074 | 5/1990 | Fang et al. | 219/548 |
| 4,935,156 | 6/1990 | van Konynenburg | 219/553 |
| 4,967,176 | 10/1990 | Horsma et al. | 338/22 R |
| 5,023,744 | 6/1991 | Hofsäss | 361/26 |
| 5,049,850 | 9/1991 | Evans | 338/22 R |
| 5,089,801 | 2/1992 | Chan et al. | 338/22 R |
| 5,254,816 | 10/1993 | Shutoh et al. | 200/144 |
| 5,296,996 | 3/1994 | Hansson et al. | 361/106 |
| 5,378,407 | 1/1995 | Chandler et al. | 252/513 |
| 5,379,176 | 1/1995 | Bacon et al. | 361/106 |
| 5,428,195 | 6/1995 | Arnold | 218/1 |
| 5,493,101 | 2/1996 | Innes | 219/502 |

OVERCURRENT PROTECTION CIRCUITS COMPRISING COMBINATIONS OF PTC DEVICES AND SWITCHES

RELATED APPLICATIONS

This application is an application under 35 USC 111(a) and claims priority under 35 USC 119 from Provisional application Ser. No. 60/003,733, filed Sep. 14, 1995 under 35 USC 111(b).

This application is related to copending, commonly assigned prior application Ser. No. 60/003,732, filed Sep. 14, 1995 under 35 USC 111(b), copending, commonly assigned prior application Ser. No. 60/003,731, filed Sep. 14, 1995 under 35 USC 111(b), and copending, commonly assigned prior application Ser. No. 60/003,743, filed Sep. 14, 1995 under 35 USC 111(b), and are incorporated herein by reference for all purposes.

This application is related to copending, commonly assigned U.S. Patent application Ser. No. 08/564,831, copending commonly assigned U.S. patent application Ser. No. 08/564,457, and copending commonly assigned U.S. patent application Ser. No. 08/564,495 which are being filed on the same day as this application, the disclosures of which are incorporated herein by reference for all purposes.

BACKGROUND OF THE INVENTION

1. Field of the Invention

This invention relates to electrical circuit overcurrent protection.

2. Introduction to the Invention

Mechanical switches are widely used to control the flow of current in electrical circuits. The term "mechanical switch" is used herein to denote an electrical switch which comprises mechanical contacts which open or close in response to a mechanical (including manual), electrical, thermal or other form of activation. Such devices include simple manual switches, circuit breakers, Ground Fault Interrupts (GFIs), relays and bimetal devices (also referred to as electrothermal relays, thermally activated switches and electro-thermal devices). GFI's compare the current flowing at two different locations in a circuit, and interrupt the circuit if the currents differ by more than a predetermined amount, e.g. as the result of a ground fault between the locations. They do not, however, protect against faults which do not result in such a current imbalance, e.g. an overcurrent resulting from a short within the load which does not go to ground.

When a mechanical switch is operated to interrupt current flowing through it, arcing nearly always occurs between the contacts as they separate, even under normal operating conditions, and current (in the form of an arc) continues to flow through the switch until the arc is extinguished. The arc will damage the contacts to an extent which depends upon the current, the voltage, whether the current is AC or DC, the speed at which the contacts operate, and the material of which the contacts are made. A mechanical switch is usually rated according to the maximum current that it can safely interrupt at a stated AC or DC voltage and for a stated number of operations.

Arcing across contacts opening under high current conditions can cause such contacts to burn and result in catastrophic failure of the mechanical device. With such limitations in mind, attempts have been made to devise circuit configurations which limit the current flowing through the mechanical contacts, or limit the voltage across the mechanical contacts, or limit both the current and the voltage, as the mechanical contacts open, in order to protect the circuit protection switches and thereby protect the electrical circuits.

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times $I_{PASS}$ at 20° C. For any individual device, the pass current and the trip current are the same. However, in this specification, reference is made to a PTC device having an $I_{PASS}$ and a different $I_{TRIP}$, because as a practical matter, the manufacturer of an electrical switch must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

SUMMARY OF THE INVENTION

We have discovered, in accordance with this invention that very useful electrical protection systems can be produced by connecting a PTC element in series with a mechanical switch or other circuit interruption element, and by connecting a bypass element in parallel with the PTC element and the circuit interruption element. When an overcurrent passes through such a system, the PTC element increases in resistance, and as a result an increased current passes through the bypass element. The bypass element is functionally linked to the circuit interruption element so that the increased current through the bypass element converts the circuit interruption element into its fault state.

In a first aspect, this invention provides an overcurrent protection system which comprises a. a control element which
(1) has a relatively low resistance, $R_{LOW}$, when a relatively low current, $I_{NORMAL}$, is passing through it, and
(2) is converted to a relatively high resistance, $R_{FAULT}$, when the current through it increases from $I_{NORMAL}$ to a relatively high current, $I_{FAULT}$;

b. a circuit interruption element which
(1) is connected in series with the control element,
(2) has a normal state when the current $I_{NORMAL}$ is passing through the control element, the normal state permitting the current $I_{NORMAL}$ to pass through the system, and
(3) has a fault state which permits the flow of at most a reduced current, substantially less than $I_{NORMAL}$; and c. a bypass element which
(1) is connected in parallel with the series combination of the control element and the circuit interruption element, and
(2) is functionally linked to the circuit interruption element so that an increase in current passing through the bypass element can convert the circuit interruption element into the fault state;

whereby, when the current through the system increases from $I_{NORMAL}$ to $I_{FAULT}$
(i) the resistance of the control element increases from $R_{LOW}$ to $R_{FAULT}$,
(ii) an increased current passes through the bypass element, and
(iii) the circuit interruption element is converted into the fault state.

In a second aspect, this invention provides an overcurrent protection system which comprises a. a circuit interruption element having
(1) a normal state which permits the flow of a normal current, $I_{NORMAL}$, and
(2) a fault state which permits the flow of at most a reduced current, substantially less than $I_{NORMAL}$;

b. a control element which
(1) is connected in series with the circuit interruption element;
(2) has a variable resistance which
(a) is low compared to the load when the current in the circuit is the normal current, $I_{NORMAL}$, and
(b) increases substantially when the current in the load substantially exceeds the normal current, $I_{NORMAL}$,
(3) comprises a comparator which compares
(a) the current, $I_{CONTROL}$, in the control element at a control comparison point, and
(b) the current, $I_{LOAD}$, in the load at a load comparison point, and
(4) changes the circuit interruption element from its normal state to its fault state when $I_{CONTROL}$ differs from $I_{LOAD}$ by more than a predetermined current imbalance value, $I_{DIFF}$; and c. a bypass element which
(1) is connected in parallel with the control element, and
(2) has a resistance such that
(a) when the circuit current is $I_{NORMAL}$, the ratio of the resistance of the bypass element to the resistance of the control element is such that $I_{CONTROL}$ differs from $I_{LOAD}$ by less than $I_{DIFF}$, and
(b) when the circuit current exceeds $I_{NORMAL}$ by a predetermined current amount, the ratio of the resistance of the bypass element to the resistance of the control element is such that $I_{CONTROL}$ differs from $I_{LOAD}$ by more than $I_{DIFF}$.

In a third aspect, this invention provides an overcurrent protection system which comprises a. a circuit interruption element having
(1) a normal state which permits the flow of a normal current, $I_{NORMAL}$, and
(2) a fault state which permits the flow of at most a reduced current, substantially less than $I_{LOAD}$; and b. a control element which
(1) is connected in series with the circuit interruption element, and
(2) has a variable resistance which
(a) is low compared to the load when the current is the normal current, $I_{NORMAL}$, and
(b) increases substantially when the current substantially exceeds the normal current, $I_{NORMAL}$;

with the circuit interruption element changing from its normal state to its fault state when the resistance of the control element has increased by a predetermined resistance amount.

In a fourth aspect, this invention provides an overcurrent protection system which comprises a. a circuit interruption element having
(1) a normal state which permits the flow of a normal current, $I_{NORMAL}$, and
(2) a fault state which permits the flow of at most a reduced current, substantially less than $I_{NORMAL}$;

b. a control element
(1) connected in series with the circuit interruption element, and
(2) having a variable resistance which
(a) is low compared to the load when the current is the normal current, $I_{NORMAL}$, and
(b) increases a first predetermined resistance amount if the current substantially exceeds the normal current, $I_{NORMAL}$; and c. a bypass element
(1) connected in parallel with the control element, and
(2) having a resistance which
(a) is substantially higher than the resistance of the control element when the circuit is in the normal operating condition,
(b) is substantially lower than the resistance of the control element when the resistance of the control element has increased by the first predetermined resistance amount, and
(c) increases by a second predetermined resistance amount when the resistance of the control element has increased by the first predetermined resistance amount, with the circuit interruption element changing from its normal state to its fault state, when the resistance of the control element has increased by the first predetermined resistance amount and the resistance of the bypass element has increased by the second predetermined resistance amount.

In a fifth aspect, this invention provides an overcurrent protection system which comprises a circuit comprising a control element and a circuit interruption element connected in series, wherein a. the circuit has
(1) a normal current, $I_{NORMAL}$, and
(2) a normal input voltage, $V_{NORMAL}$;

b. the control element has a control element trip current, $I_{TRIP}$, which is greater than $I_{NORMAL}$; and c. the circuit interruption element comprises a mechanical switch and has
   (1) a rating to carry a current, $I_{CARRY}$, which is greater than $I_{NORMAL}$, and
   (2) a rating to interrupt a current, $I_{INTERRUPT}$, which is substantially less than $I_{TRIP}$, at a voltage equal to $V_{NORMAL}$;

such that when the circuit current exceeds $I_{TRIP}$, the control element reduces the circuit current below $I_{INTERRUPT}$, thereby permitting the circuit interruption element to interrupt circuit current.

In a sixth aspect, this invention provides an overcurrent protection system which comprises a circuit comprising a bypass element and a control element connected in parallel, wherein:

a. the circuit has
   (1) a normal current, $I_{NORMAL}$, and
   (2) a normal input voltage, $V_{NORMAL}$;
b. the bypass element has a bypass element trip current, $I_{BYPASS\ TRIP}$, which is substantially less than $I_{NORMAL}$; and
c. the control element comprises a mechanical switch and has
   (1) a rating to carry a current, $I_{CONTROL\ PASS}$, which is greater than $I_{NORMAL}$, and
   (2) a rating to interrupt a current, $I_{CONTROL\ TRIP}$, which is greater than $I_{NORMAL}$, at a voltage, $V_{CONTROL\ TRIP}$ which is less than $V_{NORMAL}$;

such that when the circuit current exceeds $I_{CONTROL\ TRIP}$, the control element interrupts the current in the control element, thereby shunting the current in the circuit to the bypass element, and when the current in the bypass exceeds $I_{BYPASS\ TRIP}$, the bypass element substantially reduces the circuit current.

In a seventh aspect, this invention provides an overcurrent protection system which comprises a circuit, comprising a bypass element and a control element connected in parallel, with the parallel combination connected in series with a circuit interruption element, wherein:

a. the circuit has
   (1) a normal current, $I_{NORMAL}$, and
   (2) a normal input voltage, $V_{NORMAL}$;
b. the bypass element has a bypass element trip current, $I_{BYPASS\ TRIP}$, which is substantially less than $I_{NORMAL}$; and
c. the control element comprises a mechanical switch and has
   (1) a rating to carry a current, $I_{CONTROL\ PASS}$, which is greater than $I_{NORMAL}$, and
   (2) a rating to interrupt a current, $I_{CONTROL\ TRIP}$, which is greater than $I_{NORMAL}$, at a voltage, $V_{CONTROL\ TRIP}$ which is less than $V_{NORMAL}$; and
d. the circuit interruption element comprises a mechanical switch and has
   (1) a rating to carry a current, $I_{CARRY}$, which is greater than $I_{NORMAL}$, and
   (2) a rating to interrupt a current, $I_{INTERRUPT}$, which is substantially less than $I_{CONTROL\ TRIP}$, at a voltage equal to $V_{NORMAL}$;

such that when the circuit current exceeds $I_{CONTROL\ TRIP}$, the control element interrupts the current in the control element, thereby shunting the circuit current in the bypass element, and when the current in the bypass element is exceeds $I_{BYPASS\ TRIP}$, the bypass element reduces the circuit current below $I_{INTERRUPT}$, thereby permitting the circuit interruption element to interrupt circuit current.

In addition, in the combinations of this invention the PTC device limits the magnitude of the fault current passed to the circuit. Limiting the current in this way is a very desirable feature, and is referred to in the industry as "fault current limiting." The fault current limiting behavior of PTC devices has not previously been reported.

Moreover, in addition to overcurrent protection applications, the combinations of this invention permit the use of mechanical switches and PTC devices to switch voltages and currents in normal circuit operations, wherein the voltage and/or current ratings of the mechanical switches and PTC devices are much less than the normal operating voltages and currents of the circuits. This feature permits the use of smaller and less expensive mechanical switches and PTC devices, for normal operation, than would otherwise be required in such circuits.

Functions performed to provide overcurrent protection to an electric circuit include: 1) sensing the current; 2) interrupting the circuit; 3) limiting the energy transferred to the circuit; and 4) isolating the circuit from the power source. In the circuit arrangements of this invention, mechanical switches and polymeric PTC devices are combined so that each component performs the function or functions it does relatively well. Polymeric PTC devices sense the overcurrent and limit the energy transferred to the protected circuit. Polymeric PTC devices and mechanical switches both function to interrupt the circuit. And, where applicable, mechanical switches provide circuit isolation in compliance with industry standards.

It will be apparent that polymeric PTC devices, ceramic PTC devices, other PTC devices such as bimetal devices, metallic PTC devices, arrangements of solid state devices with PTC characteristics, and devices displaying similar characteristics may be used in the circuit arrangements of this invention to provide reliable overcurrent protection and fault current limiting. It will likewise be apparent to those of ordinary skill in the art that mechanical switches used in the circuit arrangements of this invention may include switches, relays, circuit breakers, isolators, bimetal devices and other devices. In addition, a solid state device or combination of solid state devices which provide disconnecting characteristics similar to those provided by mechanical switches may be used in place of the mechanical switches. Bimetal devices have also been referred to as bimetallic devices, electrothermal relays, thermally activated switches and/or electrothermal mechanisms with bimetal elements.

It will be apparent that in the preferred embodiments, this invention permits the use of PTC devices previously thought to be of low current carrying capacity to be arranged with mechanical switches and other electrical components to provide reliable protection for very high overcurrent conditions, which protection was not previously available in the art. These and other features, objects and advantages will be understood or apparent to those of ordinary skill in the art from the following detailed description of the preferred embodiments of the invention as illustrated in the various drawing figures.

BRIEF DESCRIPTION OF THE DRAWINGS

For a better understanding of the nature and objects of the invention, reference should be had to the following detailed description of the preferred embodiments of the invention, taken in conjunction with the accompanying drawings, in which like components are given the same reference numerals in each FIG. in which they appear, and in which.

DETAILED DESCRIPTION OF THE INVENTION

Figure 1A:
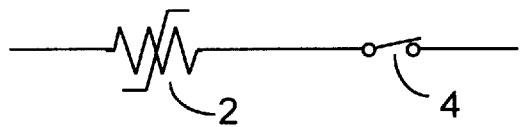
FIGS. 1a, 1b and 1c show series, parallel and series/parallel combinations of PTC devices and mechanical switches.
Figure 1B:
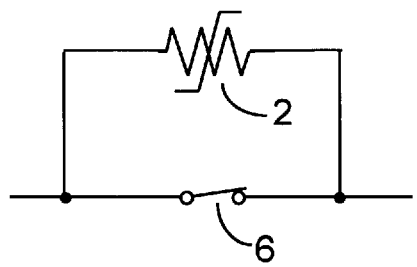
Figure 1C:
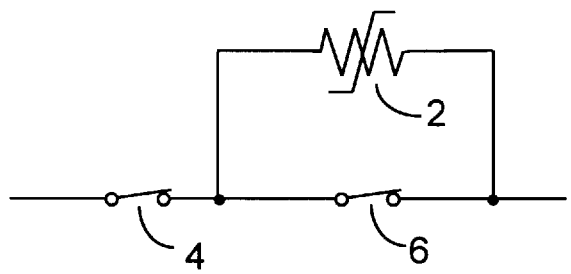

FIGS. 1a, 1b and 1c show series, parallel and series/parallel combinations of PTC devices and mechanical switches used in the overcurrent protection circuits of this invention. As will be shown below, other components are combined with the PTC devices and switches in circuit arrangements of this invention to provide supporting functionality. As used herein, the term "maximum overcurrent" refers to the maximum current that would result in a circuit from an overload or fault condition if the circuit protection devices were not present in the circuit to limit the current. In accordance with the principles of this invention, the arrangements of the components in the overcurrent protection circuits permits the selection of PTC devices and switches having the following characteristics:

1) In the arrangement shown in FIG. 1a, a PTC device 2 is in series with a mechanical switch 4, both of which have a pass current at least as high as the normal circuit current. The PTC device 2 has a voltage rating significantly below the normal voltage of the circuit. The switch 4 can interrupt a low current at the normal circuit voltage, but cannot interrupt the maximum overcurrent at the normal voltage. When an overcurrent occurs, the PTC device 2 increases in resistance and reduces the current to a point where the current is below the interrupt current of the switch 4. The switch 4 opens to interrupt the current and protects the PTC device 2 from excessive voltage.

(2) In the arrangement shown in FIG. 1b, a PTC device 2 is in parallel with a switch 6, both of which have a voltage rating at least as high as the circuit voltage. The PTC device 2 has a pass current rating significantly below the normal circuit current at the normal voltage. The switch 6 can interrupt the maximum overcurrent at a low voltage, but cannot interrupt the maximum overcurrent at normal voltage. When an overcurrent occurs, the switch 6 interrupts the current at low voltage by shunting the current into the PTC device 2. The PTC device 2 increases in resistance and reduces the current to a low value.

(3) In the arrangement shown in FIG. 1c, a parallel combination of a PTC device 2 and a first switch 6, as described in (2) above, are in series with a second switch 4. In this case, the parallel combination of the PTC device 2 and first switch 6 has a voltage rating significantly below the normal voltage of the circuit. The second switch 4 can interrupt a low current at the normal voltage, but cannot interrupt the maximum overcurrent at normal voltage. When an overcurrent occurs, the first switch 6 opens shunting current to the parallel PTC device 2. The PTC device 2 increases in resistance thereby reducing the current and allowing the second switch 4 to open. In this arrangement, the PTC device switches to its high resistance state fast enough to reduce the current to protect the series switch from being damaged. While delaying the opening of the second switch 4 may be beneficial in some circumstances, this arrangement is also effective with both switches 4,6 opening essentially simultaneously.

In the series combination shown in FIG. 1a, the series switch 4 is shown following the PTC device 2 in the circuit. In the series/parallel combination shown in FIG. 1b, the series first switch 4 is shown preceding the parallel combination of the PTC device 2 and the parallel second switch 6 in the circuit. Although the electrical properties of the overcurrent protection circuits are not dependent on such order, other considerations may dictate the placement of series switches. For example, the order shown in FIG. 1c has the added advantage that, in case of overcurrent, the series first switch 4 could serve to isolate additional components in the overcurrent protection circuit, in addition to isolating the load, from the power source. This is particularly necessary when these components are accessible to and liable to be touched by humans.

FIGS. 2a, 2b, 2c and 2d show block diagrams depicting operational elements of an overcurrent protection circuit that perform the functions of sensing the current, interrupting the circuit, limiting the energy transferred to the circuit, and, in some arrangements, isolating the circuit from the power source. The block diagrams of FIGS. 2a and 2b correspond to the series arrangement of a PTC device 2 and a switch 4 shown in FIG. 1a, with the control element 104 comprising the PTC device 2, the interrupt element 108 comprising the series switch 6, and, in FIG. 2b, the bypass element 106 comprising additional circuit components. The block diagram of FIG. 2c corresponds to the parallel arrangement of a PTC device 2 and a switch 4 shown in FIG. 1b, with the control element 104 comprising the parallel switch 6 and the bypass element 106 comprising the PTC device 2, The block diagram of FIG. 2d corresponds to the series/parallel arrangement of a PTC device and switches 4,6 shown in FIG. 1c, with the interrupt element comprising the series switch 4, the control element comprising the parallel switch 6, and the bypass element comprising the PTC device 2.

As is apparent from the previous discussion, although the PTC devices used in the circuit arrangements of this invention normally provide the functions of sensing the current and limiting the fault current, depending on the particular arrangement of the components in the various embodiments of the several aspects of this invention, the PTC devices may perform these functions as members of different operational elements, e.g. control element 104 and bypass element 106.

Figure 2A:
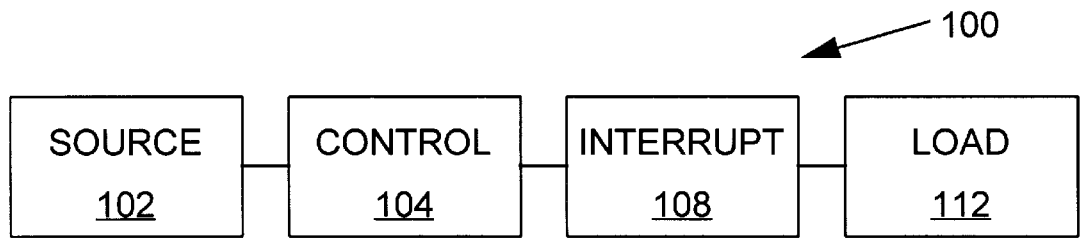
FIGS. 2a, 2b, 2c and 2d show block diagrams depicting general overcurrent protection functions performed by electrical components in overcurrent protection circuits of this invention.
Figure 2B:
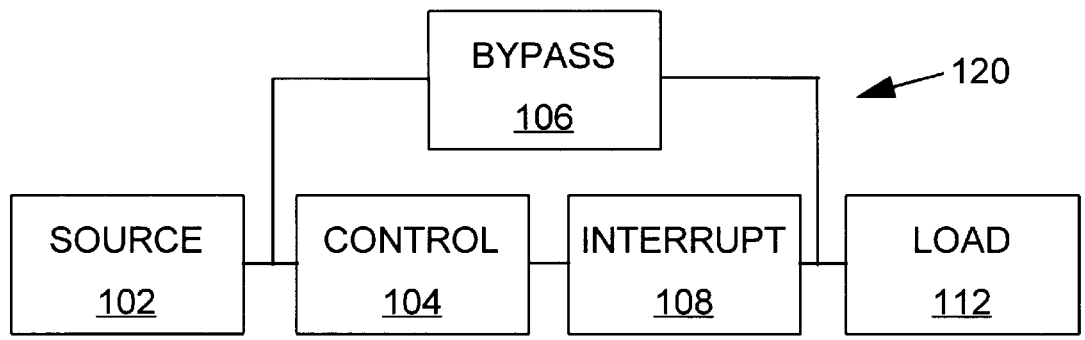
Figure 2C:
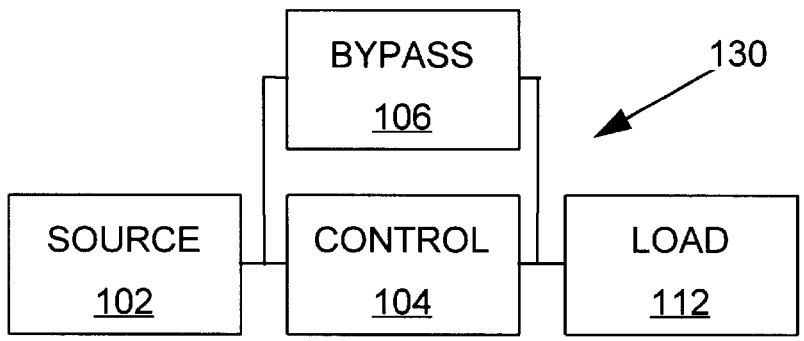

The block diagram in FIG. 2b represents a first aspect of an overcurrent protected circuit, referred to by the general reference character 120. In the first aspect of overcurrent protection circuits of this invention, the three functions of sensing the current, interrupting the circuit, and limiting the energy transferred to the circuit are performed by components which may be considered as being grouped in three operational elements, a control element 104, a bypass element 106 and an interrupt element 108. The source 102 and load 112 elements are two operational elements normally found in all electrical circuits.

The source 102 provides the electrical power to the circuit, and the load 112 performs the intended purpose of the circuit. The control 104, bypass 106 and interrupt 108 elements work cooperatively to provide the overcurrent protection. The control element 104 performs the two functions of sensing the current and limiting the energy transferred to the circuit in case of an overcurrent. The interrupt element 108 performs the function of interrupting the circuit current. The bypass element 106 is used to divert some or all of the load current to minimize the current in the interrupt element 108, or the voltage across the interrupt element 108, or both the current and the voltage, so that the interrupt element 108 may safely interrupt the circuit current.

The control element 104 senses the current and determines whether the current delivered to the load 112 is within a normal, acceptable range. When the control element 104 determines that the current delivered to the load 112 is excessive, the control element 104 works with the bypass element 106 to divert current to the bypass element 106. When the current diverted to the bypass element 106 reaches an established threshold, the bypass element 106 communicates with the interrupt element 108 causing the interrupt element 108 to reduce or stop the flow of current delivered to the load 112. The control element 104 limits the energy transferred to the circuit in an overcurrent condition by working rapidly to sense an overcurrent and divert current to the bypass element 106, thereby permitting the interrupt element 108 to safely interrupt the current delivered to the load 112.

Figure 3A:
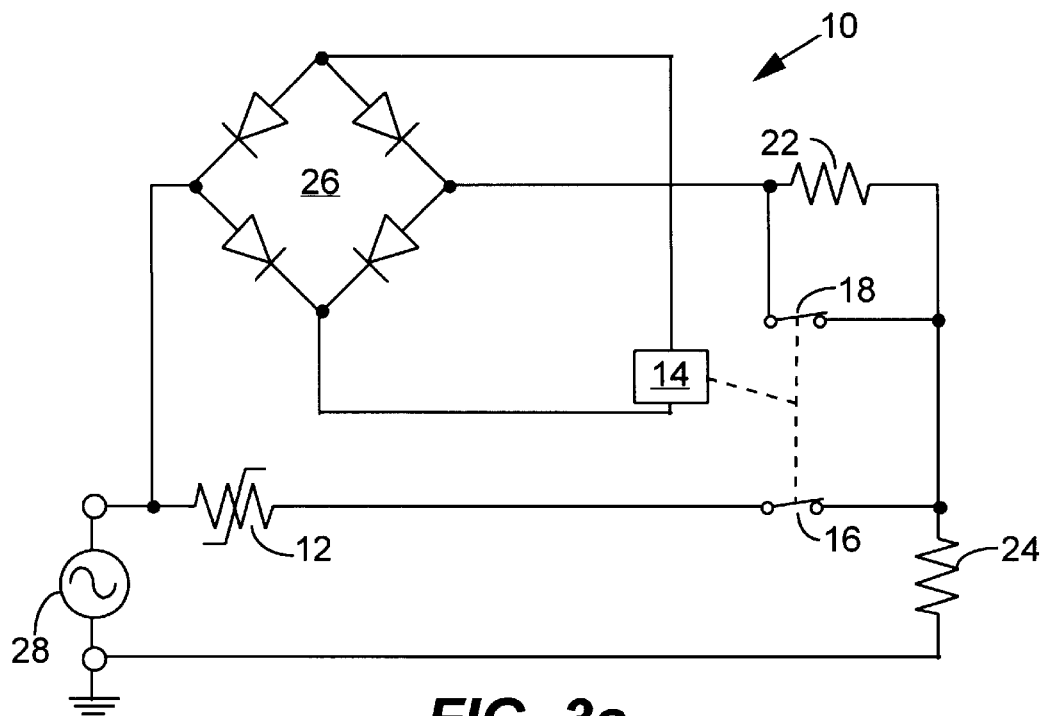
FIG. 3a is a circuit diagram of an embodiment of a first aspect of an overcurrent protection circuit employing a certain arrangement of a PTC device, full-wave bridge rectifier, relay and resistors in an alternating current (AC) application in accordance with the principles of this invention.

An embodiment of a first aspect of an overcurrent protection circuit employing a certain arrangement of a PTC device, full-wave bridge rectifier, relay and resistors in an AC application in accordance with the principles of this invention is shown in FIG. 3a. The overcurrent protection circuit 10 provides for protection in case of an overcurrent condition. In this first embodiment, a PTC device 12 is connected in series with the load 24. The AC power source 28 supplies power at a normal operating voltage ($V_{NORMAL}$) to the load 24. With the power source 28 at the operating voltage, the normal current ($I_{NORMAL}$) supplied in the PTC device 12 and the load 24 is below the PTC device's 12 trip current, the resistance of the PTC device 12 is very low ($R_{LOW}$), and the resulting voltage drop across the PTC device 12 is very low. The relay 14 is de-energized and the first contact 16 and second contact 18 of the relay are both in the closed position. The first and second contacts 16,18 may be rated to carry a current ($I_{CARRY}$) which is greater than the normal current, and be rated to interrupt a current ($I_{INTERRUPT}$) which is substantially less than fault current ($I_{FAULT}$) at a voltage equal to the normal operating voltage. With the power source 28 at the operating voltage, and with the resistance of the PTC device 12 very low, the voltage input to the bridge rectifier circuit 26 is equal to the voltage across the PTC device 12 and is negligible. The resultant output voltage from the bridge rectifier circuit 26 is therefore below the voltage necessary to energize the relay 14.

In the event of a fault causing the current in the PTC device 12 to increase above the current rating of the PTC device 12, the resistance of the PTC device 12 increases significantly $R_{FAULT}$. The voltage drop across the PTC device 12 is then sufficient to cause the voltage output from the bridge rectifier circuit 26 to energize the relay 14.

With the relay 14 energized, the first contact 16 and the second contact 18 open, placing the bypass resistor 22 in series with the load 24, and thereby limiting the current in the load 24 to a safe value. With the voltage of the power source 28 at the operating voltage, the relay 14 would remain energized by the trickle current in the relay coil 14 and the load 24.

With the relay 14 energized, the PTC device 12 is disconnected from the load 24 circuit. With no current passing in the PTC device 12, the PTC device 12 cools and the resistance of the PTC device 12 returns to a very low value.

The overcurrent protection circuit 10 is reset by reducing the voltage of the power source 28 thereby decreasing the voltage across the relay 14 below the holding voltage of the relay 14, thereby closing the first contact 16 and the second contact 18.

Figure 3B:
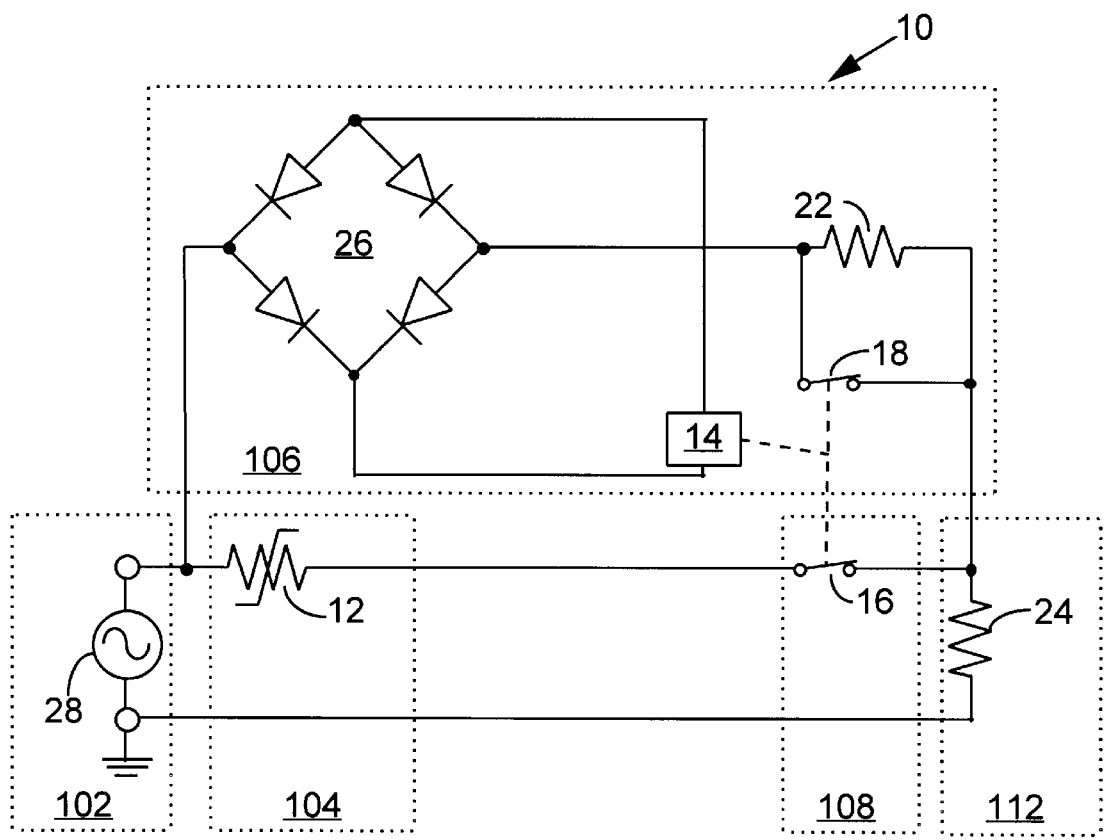
FIG. 3b shows the circuit diagram of FIG. 3a with dotted lines surrounding the circuit components which respectively perform the functions depicted in the functional block diagram of FIG. 2b.

FIG. 3b shows the overcurrent protection circuit 10 of FIG. 3a with dotted lines surrounding the circuit components of the overcurrent protection circuit 10 to correspond with the five elements depicted in FIG. 2b, i.e., source 102, control 104, bypass 106, interrupt 108 and load 112 elements.

Figure 3C:
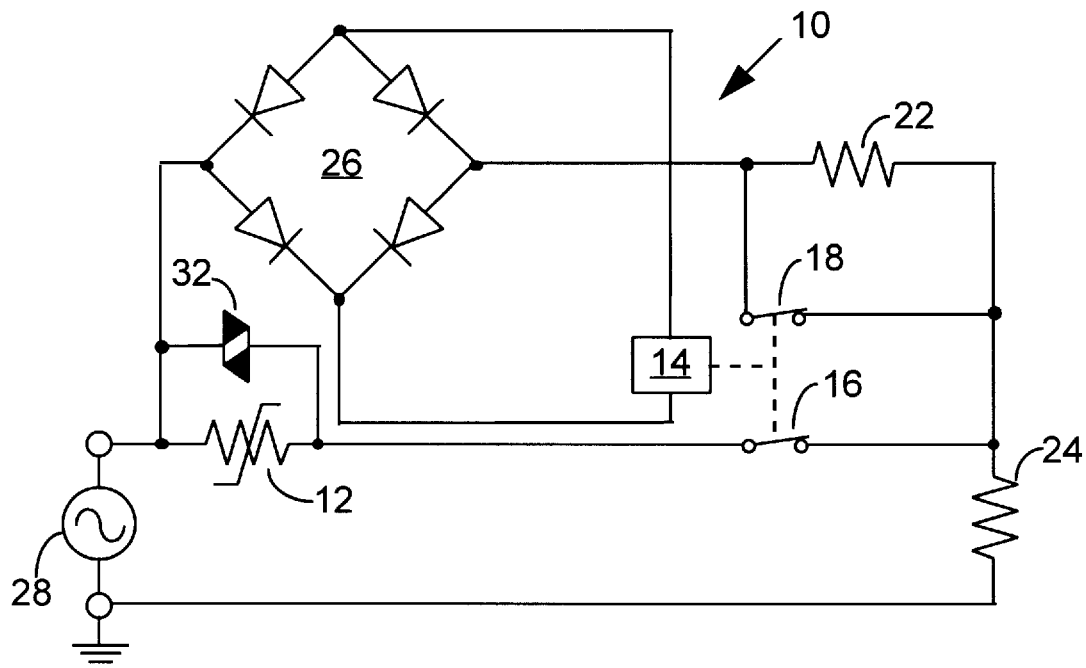
FIG. 3c is a circuit diagram of a variant of the circuit of FIG. 3a additionally employing a varistor as an over-voltage clamping device.

FIG. 3c shows the circuit arrangement of FIG. 3a supplemented with a varistor 32 connected in parallel with the PTC 12. The varistor 32 acts as a voltage clamping device to limit the voltage that might be induced across the PTC 12 in response to an initial rapid increase of the resistance of the PTC 12. This is likely to occur in response to a sharply rising overcurrent causing the PTC 12 to switch to its high resistance state rapidly. The induced voltage across the PTC 12 can be large due to the circuit inductance when the current is reduced to a low value by the rapidly increasing resistance of the PTC 12. Other voltage clamping devices such as back-to-back Zener diodes, arrangements of diodes, and other devices may be used in place of the varistor 32.

Figure 3D:
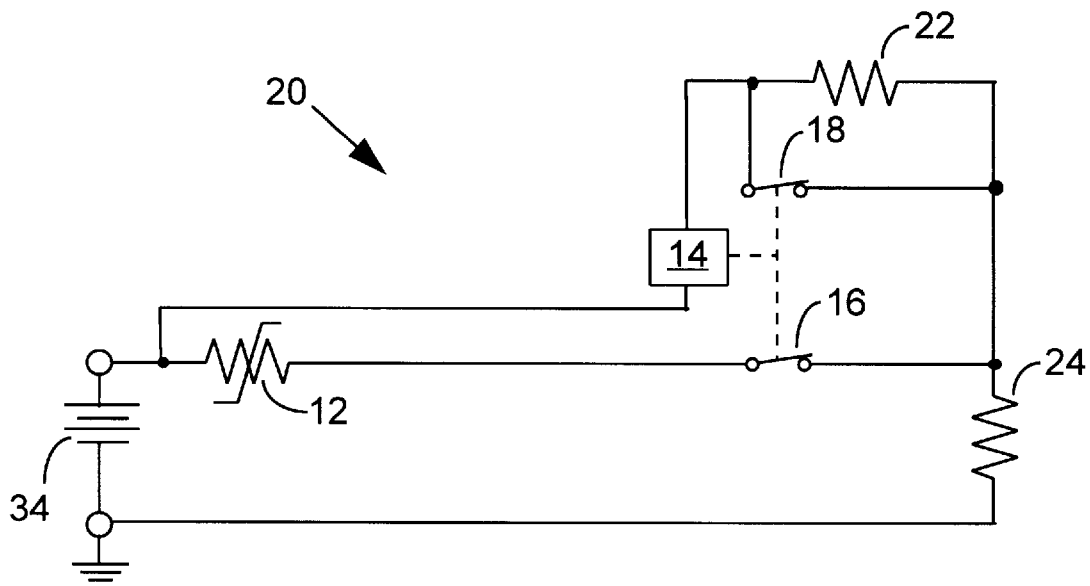
FIGS. 3d and 3e are circuit diagrams of further variants of the overcurrent protection circuits of FIGS. 3a and 3c, respectively, showing the use of the overcurrent protection circuits in direct current (DC) applications in accordance with the principles of this invention.

FIG. 3d shows the overcurrent protection circuit arrangement of FIG. 3a simplified for use in DC applications. The bridge rectifier circuit 26 shown in FIG. 3a is absent in FIG. 3d, with the relay coil 14 connected across the PTC 12. The power source 34 in the circuit of FIG. 3d is a DC power source. The behavior of the remaining circuit components in FIG. 3d is similar to that described for the components in FIG. 3a.

Figure 3E:
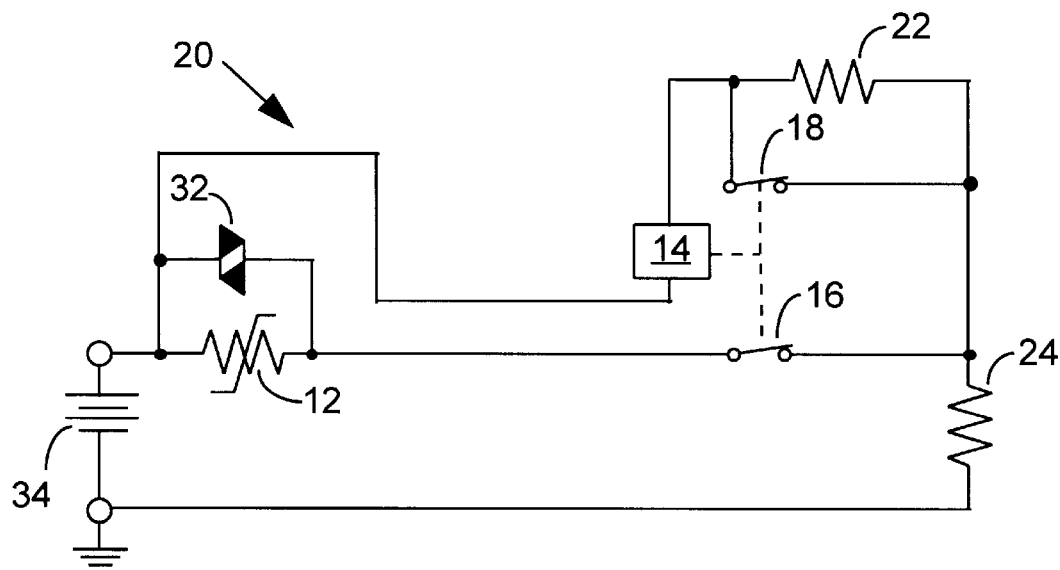

FIG. 3e shows the circuit arrangement of FIG. 3d supplemented with a varistor 32 connected in parallel with the PTC 12. The varistor 32 acts as a voltage clamping device in the same manner in FIG. 3e as the varistor 32 in FIG. 3c. Other voltage clamping devices such as back-to-back Zener diodes, arrangements of diodes, and other devices may be used in place of the varistor 32.

Figure 3F:
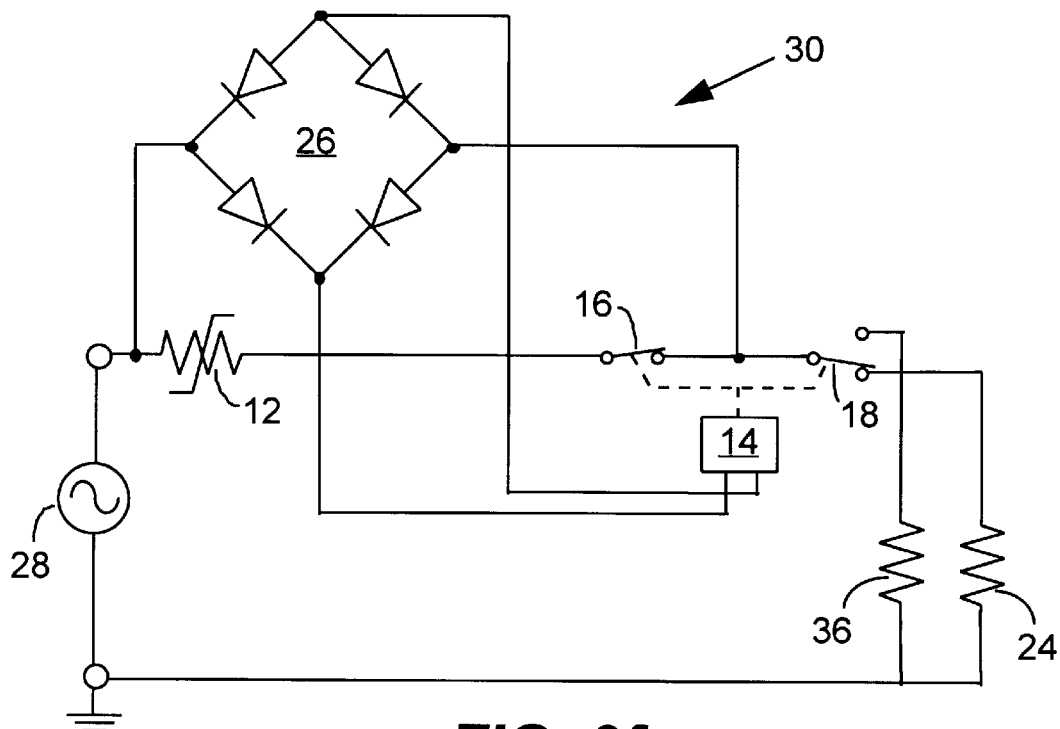
FIGS. 3f and 3g are circuit diagrams of two additional arrangements of an embodiment of a first aspect of an overcurrent protection circuit employing a PTC device, full-wave bridge rectifier, relay and resistors in AC applications in accordance with the principles of this invention.

A second arrangement of an embodiment of a first aspect of an overcurrent protection circuit 30 in accordance with this invention is shown in FIG. 3f. In this arrangement, with the power source 28 supplying an operating voltage, the relay 14 is de-energized with the first contact 16 closed, and the second contact 18 closed making the circuit with the load 24. In the event of an overcurrent, the temperature of the PTC device 12 rises quickly and the resistance of the PTC device 12 increases. The voltage output from the rectifier bridge circuit 26 energizes the relay 14. The first contact 16 opens removing the PTC 12 from the circuit, and the second contact 18 opens the circuit with the load 24 and closes the circuit with the dropping resistor 36 thus keeping the relay 14 energized. With the first contact 16 open, there is no current in the path of the PTC device 12. The PTC device 12 cools, and the resistance of the PTC device 12 returns to a very low value. The second contact 18 safely removes the load from the power source 28.

The overcurrent protection circuit 30 is reset by reducing the supply voltage at the power source 28. With the power source 28 voltage reduced, the relay 14 is de-energized, the first contact 16 closes placing the PTC 12 in the circuit, and the second contact 18 closes the circuit with the load 24.

Figure 3G:
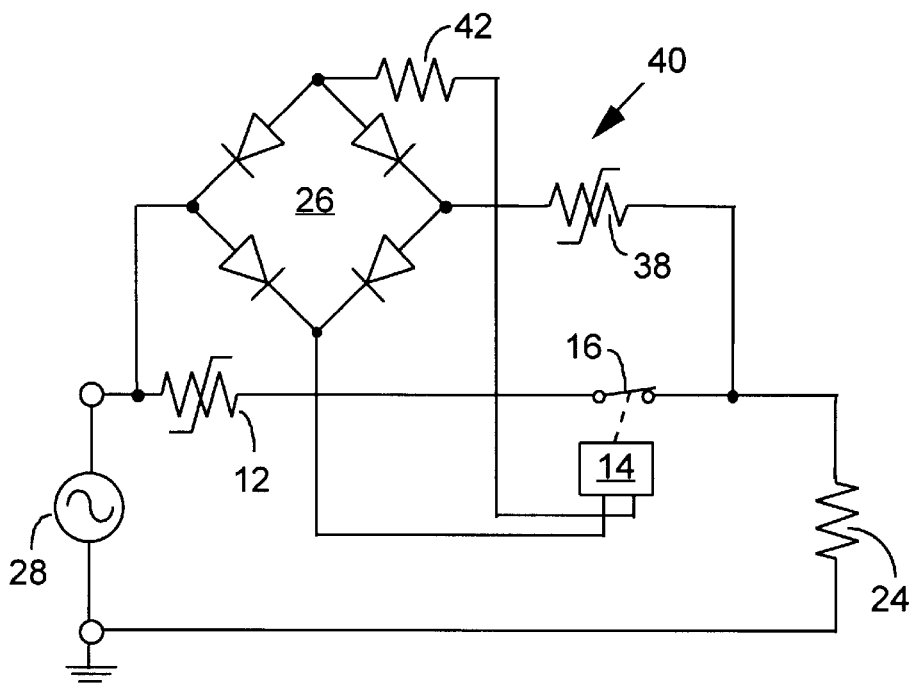

A third arrangement of an embodiment of a first aspect of an overcurrent protection circuit 40 in accordance with this invention is shown in FIG. 3g. This third arrangement provides the overcurrent protection provided by the first 10 and second 30 arrangements shown in FIGS. 3a and 3f respectively, and additionally will automatically reconnect the load 24 after a specified time delay if the cause of the overload has been removed. This third arrangement of an embodiment of a first aspect of an overcurrent protection circuit 40 includes a bypass PTC 38, and uses only a first contact 16 of the relay 14. The bypass PTC 38 is designed to switch from its low resistance to its high resistance at a lower current than that at which the PTC 12 switches. In this third arrangement, with the power source 28 supplying an operating voltage, the relay 14 is de-energized with the first contact 16 closing the circuit with the load 24. In the event of an overcurrent condition, the high current in the PTC 12 causes the resistance of the PTC 12 to increase. The resultant voltage output increase from the rectifier bridge circuit 26 energizes the relay 14 opening the first contact 16. The relay 14 is held in the energized state by the current flow in the bypass PTC 38 and the load 24. After a time delay, determined by the value of the bypass resistor 42 placed in series with the coil of the relay 14, the bypass PTC 38 resistance becomes very high, causing the relay 14 to be de-energized, thereby closing the first contact 16. If the cause of the fault has been removed during the time delay, the reconnected circuit 40 continues its normal operation. If the cause of the fault persists, the PTC 12 immediately re-trips to its high resistance state before the bypass PTC 38 has cooled, preventing the relay 14 from re-energizing. If the cause of the fault has not been removed, both the PTC 12 and the bypass PTC 38 remain in a high resistance state until either the power source 28 supply voltage is removed or the load 24 is removed. With the power supply 28 or load 24 removed, both the PTC 12 and the bypass PTC 38 cool and their respective resistances return to low values thereby allowing normal circuit operation.

Referring again to FIGS. 3f and 3g, a voltage clamping device such as a varistor 32 shown in FIG. 3c may be connected in parallel with the PTC 12 to limit voltages induced by the rapid decrease in circuit current. Other voltage clamping devices such as back-to-back Zener diodes, arrangements of diodes or other devices may also be used in place of the varistor 32.

Although not illustrated in any of the FIGS., AC relays may be used in place of the DC relays for AC applications, in which case the full-wave bridge rectifier circuits 26 would not be used. Likewise, although described for use in AC applications, the circuits shown in FIGS. 3a, 3b, 3c, 3f and 3g may also be used in DC applications, although the bridge rectifier circuits 26 would be superfluous. A systems shown in FIGS. 3f and 3g may also be modified for DC applications by removing the bridge rectifier circuit 26 in a manner similar to that shown in FIGS. 3d and 3e.

The electrical components in each of the circuits shown in FIGS. 3c through 3g may be grouped in a manner similar to that shown in FIG. 3b for the circuit of FIG. 3a, with the groupings of the electrical components represented by the operational elements shown in FIG. 2b.

Figure 2D:
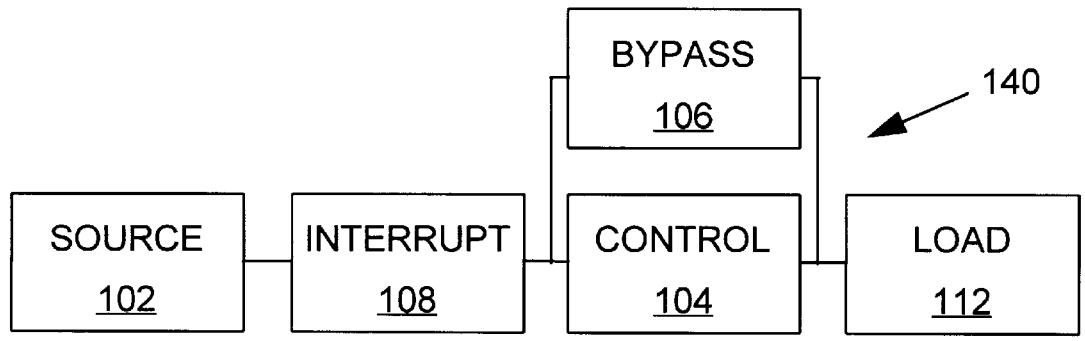

FIG. 2d shows a functional block diagram that represents the functions performed by electrical components in an embodiment of a second aspect of overcurrent protection circuits in accordance with this invention. The overcurrent protected circuit, referred to by the general reference character 140, includes the five operational elements represented in FIG. 2b, however, the interrupt element 108 is shown preceding the control element 104, and the bypass element 106 is shown in parallel with the control element 104.

The source 102 provides the electrical power to the circuit 140, and the load 112 performs the intended purpose of the circuit 140. The control 104, bypass 106 and interrupt elements 108 work cooperatively to provide the overcurrent protection. The control element 104 performs the functions of sensing the current and limiting the energy transferred to the circuit in case of fault. The interrupt element 108 performs the functions of interrupting the circuit and providing circuit isolation.

The control element 104 determines whether the current delivered in the load 112 is within a normal, acceptable range. When the control element 104 determines that the current delivered in the load 112 is excessive, the control element 104 works with the bypass element 106 to divert current to the bypass element 106. When the current diverted to the bypass element 106 reaches an established threshold, the control element 104 communicates with the interrupt element 108 causing the interrupt element 108 to stop the flow of current delivered to the load 112.

Figure 4A:
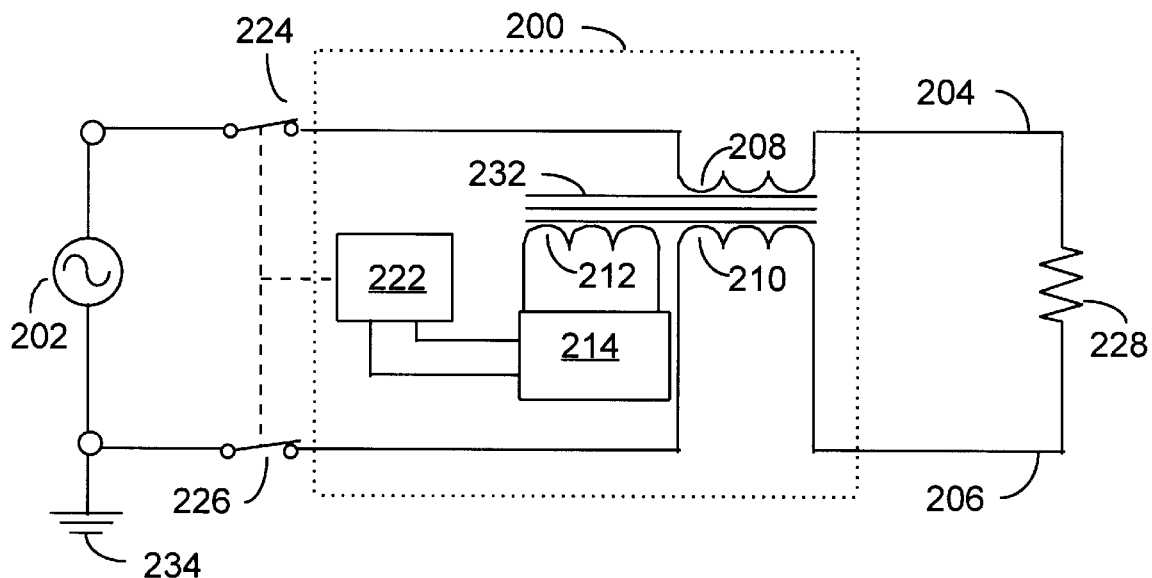
FIG. 4a is a circuit diagram of a conventional GFI circuit.

A typical circuit in a conventional GFI device known in the prior art is shown in FIG. 4a. To simplify description of the circuits in subsequent FIGS., the components comprising the GFI device, except for the contacts 224,226, and shown within the dotted lines, are given the general reference character 200. In the conventional GFI circuit the line 204 and return 206 currents flow in opposite directions in the two primary windings 208,210 of the GFI transformer 232. If the line 204 and return 206 currents are equal, the resulting magnetic field in the GFI transformer 232 is zero and the induced current in the secondary winding 212 is essentially zero. If the line 204 and return 206 currents are not equal, for example in the case of a ground fault from the line 204 to ground 234, then the imbalanced currents cause a magnetic field in the GFI transformer 232. If the current imbalance exceeds an established threshold, the resulting magnetic field in the GFI transformer 232 causes an induced current in the secondary winding 212 to exceed an established threshold. A detection circuit 214 determines that the induced current in the secondary winding 212 exceeds an established threshold and energizes a latching relay 222. When the latching relay 222 is energized, the normally closed contacts 224,226 are opened thereby removing the power applied to the load 228. The contacts 224,226 remain open until they are manually reset to the closed position.

Figure 4B:
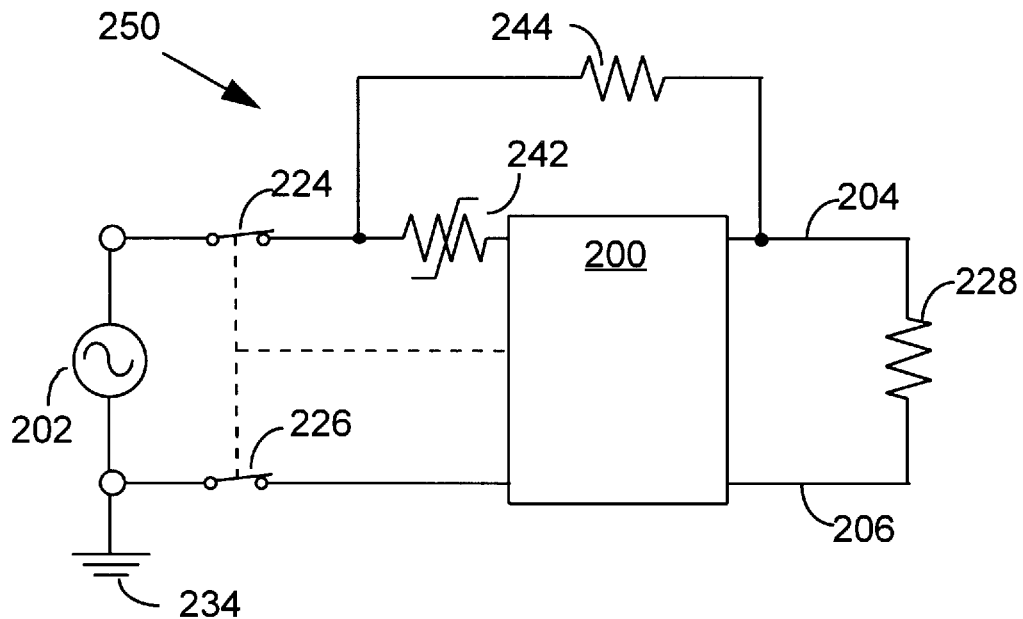
FIG. 4b is a circuit diagram of an arrangement of an embodiment of a second aspect of an overcurrent protection circuit employing PTC devices, GFI devices and resistors in accordance with the principles of this invention.

An arrangement of an embodiment of a second aspect of an overcurrent protection circuit in accordance with this invention is shown in FIG. 4b. In the overcurrent protection circuit 250 shown in FIG. 4b, a PTC 242 is placed in series with the GFI 200 and the line 204, and a bypass resistor 244 is in parallel with the series PTC 242 and GFI 200. Under normal operating conditions, the current in the PTC 242 is below the trip current and the resistance of the PTC 242 is low. Under overcurrent conditions, the PTC 242 increases in resistance and limits the current in the PTC 242 into the GFI 200. As a result, current is shunted around the PTC 242 and GFI 200 in the bypass resistor 244, thus causing an imbalance in the current in the GFI 200. When the current imbalance in the GFI 200 reaches an established amount, the GFI 200 opens the contacts 224,226 interrupting the current to the load 228.

The electrical components in the circuits shown in FIG. 4b may be grouped in a manner similar to that shown in FIG. 3b for the circuit of FIG. 3a, with the groupings of the electrical components represented by the operational elements shown in FIG. 2d.

Figure 4C:
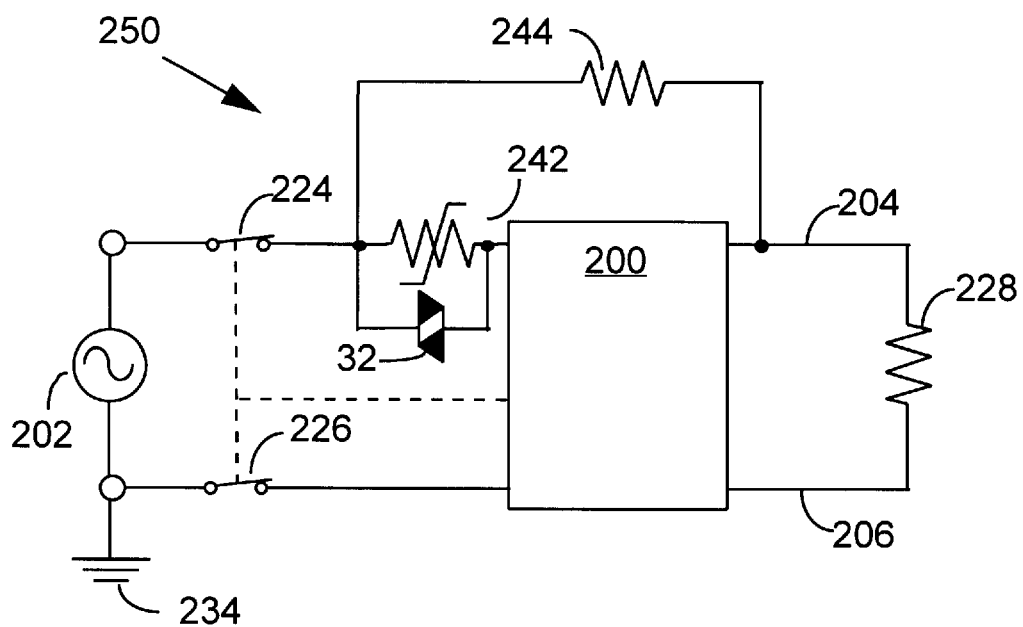
FIG. 4c is a circuit diagram of a variant of the circuit of FIG. 4b additionally employing a varistor as an over-voltage clamping device.

Referring to FIG. 4c, a voltage clamping device such as a varistor 32 may be connected in parallel with the PTC 242 in FIG. 4b to limit voltages induced by the rapid decrease in circuit current. Other voltage clamping devices such as back-to-back Zener diodes, arrangements of diodes or other devices may also be used in place of the varistor 32.

Referring again to FIG. 2a, the figure shows a functional block diagram that represents the functions performed by electrical components in an embodiment of a third aspect of overcurrent protection circuits in accordance with this invention. The overcurrent protected circuit, referred to by the general reference character 100, includes four of the five operational elements previously described, i.e., the source 102, control 104, interrupt 108 and load 112 elements.

The source 102 provides the electrical power to the circuit, and the load 112 performs the intended purpose of the circuit. The control and interrupt elements work cooperatively to provide the overcurrent protection. The control element 104 performs the two functions of sensing the current and limiting the energy transferred to the circuit in case of overcurrent. The interrupt element performs the function of interrupting the circuit current.

The control element senses the current and determines whether the current delivered to the load 112 is within a normal acceptable range. When the control element 104 determines that the current delivered to the load 112 is excessive, the control element 104 reduces the circuit current. By reducing the circuit current, the control element 104 communicates with the interrupt element 108 causing the interrupt element to further reduce or stop the flow of current delivered to the load 112. The control element 104 limits the energy transferred to the circuit in an overcurrent condition by working rapidly to sense the overcurrent and reduce the overcurrent thereby permitting the interrupt element to safely interrupt the current delivered to the load 112.

Figure 5A:
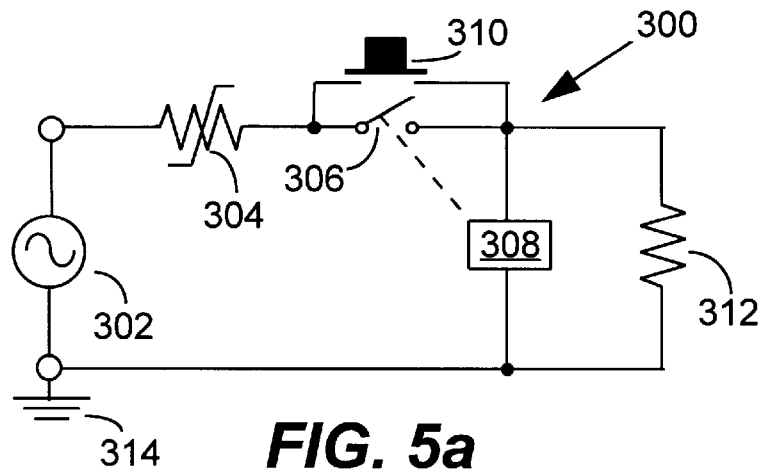
FIGS. 5a and 5b are circuit diagrams of two arrangements of an embodiment of a third aspect of an overcurrent protection circuit employing PTC devices and relays in accordance with the principles of this invention.

An embodiment of a third aspect of an overcurrent protection circuit employing a PTC device and a relay in an AC application in accordance with the principles of this invention is shown in FIG. 5a. In this embodiment, a PTC device 304 is connected in series with the load 312, and a normally open relay contact 306 is in series between the PTC device 304 and the load 312. The relay coil 308 is connected in parallel with the load 312. A system is closed by means of the switch 310, depicted in FIG. 5a as a push-switch. When the switch 310 is closed, current flows in the circuit 300 and the relay coil 308 is energized. The energized relay coil 308 closes the relay contact 306, latching the relay 308 in the energized state with the relay contact 306 closed.

If an overcurrent occurs, the PTC device 304 increases in resistance reducing the circuit current 300, thereby reducing the voltage across the load 312 and relay coil 308. When the voltage across the relay coil 308 falls below the holding voltage, $V_{HOLd}$, of the relay coil 308, the relay contact 306 will return to the open condition, and remain latched in the open position.

Figure 5B:
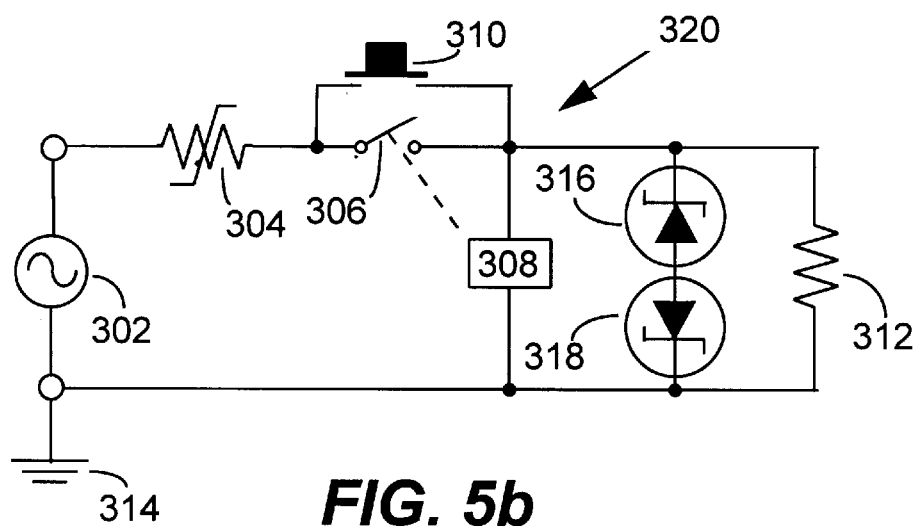

A system shown in FIG. 5b is the circuit of FIG. 5a with back-to-back Zener diodes 316,318 added in parallel with the relay coil 308 and load 312. This arrangement provides for overvoltage protection in addition to overcurrent protection. For voltages greater than the breakdown voltage of the Zener diodes 316,318, the Zener diodes 316,318 would draw a large current which in turn would cause the resistance of the PTC device 304 to increase, thereby reducing the voltage across the relay coil 308, causing the relay contact 306 to open.

Figure 5C:
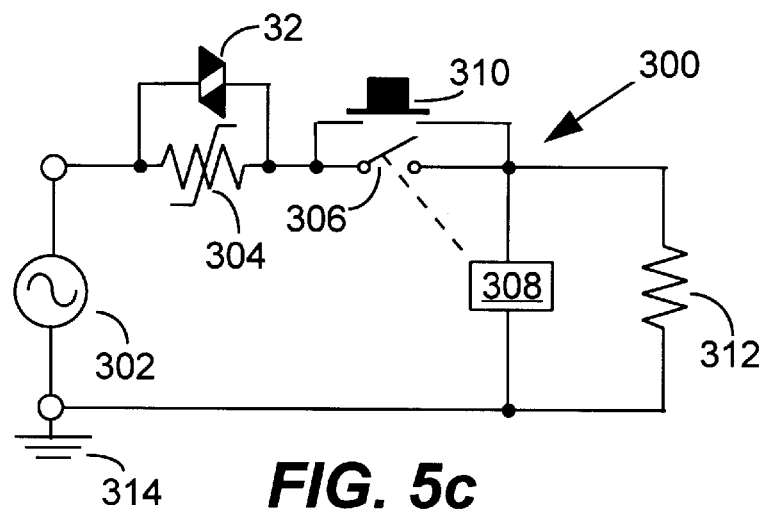
FIG. 5c is a circuit diagram of a variant of the circuit of FIG. 5b additionally employing a varistor as an over voltage clamping device.

Referring to FIG. 5c, a voltage clamping device, such as a varistor 32, may be placed in parallel with the PTC device 304 to limit the voltage that might be induced across the PTC device 304 in response to an initial rapid increase of the resistance of the PTC device 304.

FIGS. 6a through 6f show several arrangements of an embodiment of a fourth aspect of an overcurrent protection circuit employing a PTC device and a bimetal switch in accordance with the principles of this invention. Although the circuits shown in FIGS. 6a through 6f depict an AC source 402, the overcurrent protection circuits also apply to DC applications.

The overcurrent protection circuits shown in FIGS. 6a through 6f include the series, parallel and series-parallel arrangements of FIGS. 1a, 1b and 1c, and include the respective voltage and current rating relationships applicable to each as described above.

Figure 6A:
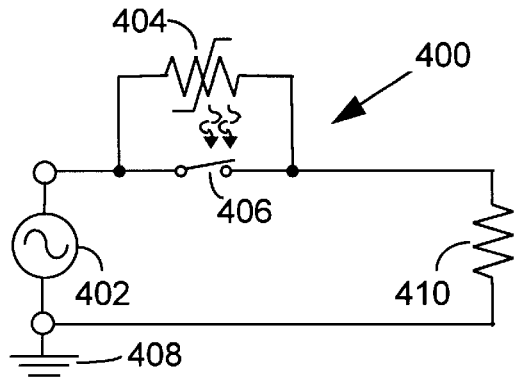
FIGS. 6a through 6f are circuit diagrams of six arrangements of an embodiment of a fourth aspect of an overcurrent protection circuit employing PTC devices and bimetal switches in accordance with the principles of this invention.

FIG. 6a shows an overcurrent protection circuit 400 with a PTC device 404 connected in series with a load 410, and a bimetal switch 406 connected in parallel with the PTC device 404. In addition the PTC device 404 and bimetal switch 406 are thermally coupled. This arrangement takes advantage of the low resistance and controlled trip temperature of the bimetal switch 406. In case of an overcurrent, the bimetal switch 406 heats and opens, shunting the current to the PTC device 404. The overcurrent in the PTC device 404 causes the PTC device 404 to quickly trip to its high resistance state, reducing the current to a very low level. The low current in the PTC device 404 keeps the PTC device 404 heated and in a high resistance state. The heat from the PTC device 404 latches the bimetal switch 406 in the tripped state, preventing oscillation of the contacts of the bimetal switch 406.

In shunting the current to the PTC device 404, the contacts of the bimetal switch 406 do not arc since they do not have to switch the current at operating voltage. In this arrangement, the PTC device 404 and bimetal switch 406 serve to limit the fault current delivered to the circuit.

Figure 6B:
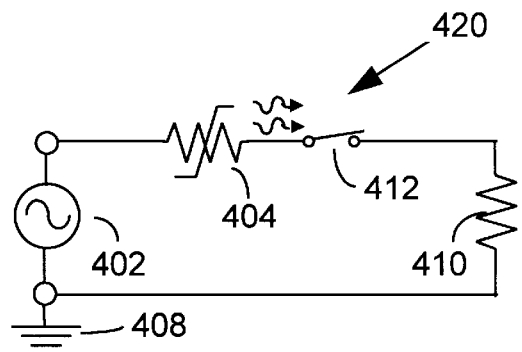

FIG. 6b shows an overcurrent protection circuit 420 with the PTC device 404 and a series bimetal switch 412 in series with the load 410. The PTC device 404 and series bimetal switch 412 are thermally coupled. In this arrangement, an overcurrent would trip the PTC device 404 causing the PTC device 404 to change to its high resistance state. The heat from the PTC device 404 trips the series bimetal switch 412. The contacts of the series bimetal switch 412 open, removing the voltage from the PTC device 404. This arrangement has the advantage that permits the PTC device 404 to work in higher voltage applications, and the combination provides overcurrent protection at higher voltages.

In certain applications it is advantageous to permit the series bimetal switch 412 to reclose automatically after interrupting the overcurrent in case the cause of the overcurrent is no longer present. This would happen automatically in the circuit shown in FIG. 6b after the series bimetal switch 412 opens stopping the current flow. As the PTC device 404 would then cool allowing the series bimetal switch 412 to reclose. If the overcurrent were still present, the PTC device 404/series bimetal switch 412 combination would again interrupt the circuit current. This action would continue to repeat as long as the cause of the overcurrent were present. In applications where it is not desirable to permit the series bimetal switch 412 to automatically reclose, the series bimetal switch 412 could be a latching device such as the latching bimetal switch 432 with a reset button 422 as shown in FIGS. 6e and 6f.

Figure 6C:
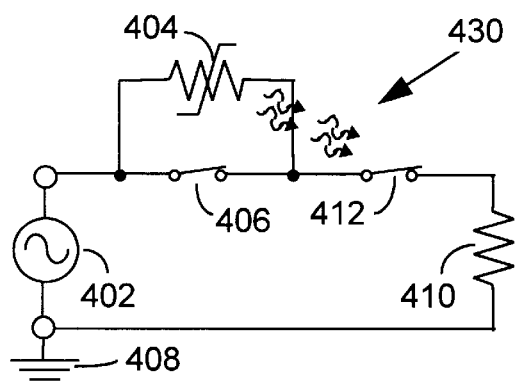

FIG. 6c shows an overcurrent protection circuit 430 with a parallel combination of the PTC device 404 and bimetal switch 406 in series with the series bimetal switch 412. This arrangement provides the overcurrent protection features of the parallel arrangement of FIG. 6a, with the higher voltage capability and galvanic open of the series arrangement of FIG. 6b. In this arrangement, the parallel bimetal switch 406 trips on an overcurrent shunting the current to the PTC device 404. The PTC device 404 then switches to its high resistance state, reducing the circuit current 430 to a very low level. The heat from the PTC device 404 trips the series bimetal switch 412 which removes the voltage from the PTC device 404. The opening of the contacts on the series bimetal switch 412 is at a very low current. As shown in FIG. 6c, the arrangement would cycle after the series bimetal switch opens 412 and the PTC device 404 and parallel bimetal switch 406 cool. As indicated above, in applications where an automatic reset capability is not desirable, the series bimetal switch 412 may be a latching device and include a manual reset button 422 as shown in FIGS. 6e and 6f. FIG. 6e also shows a voltage clamping device, such as a varistor 32, which may be placed in parallel with the PTC device 404 to limit the voltage that might be induced across the PTC device 404 in response to an initial rapid increase of the resistance of the PTC device 404.

Figure 6D:
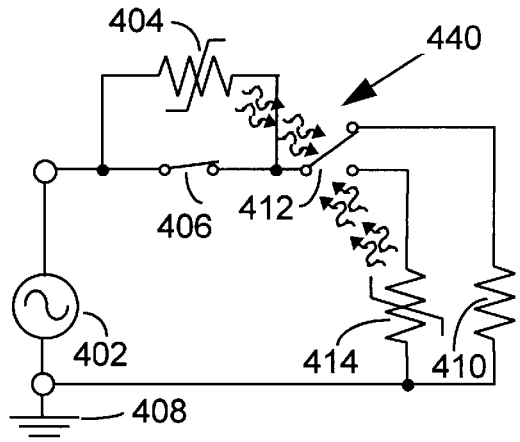
Figure 6E:
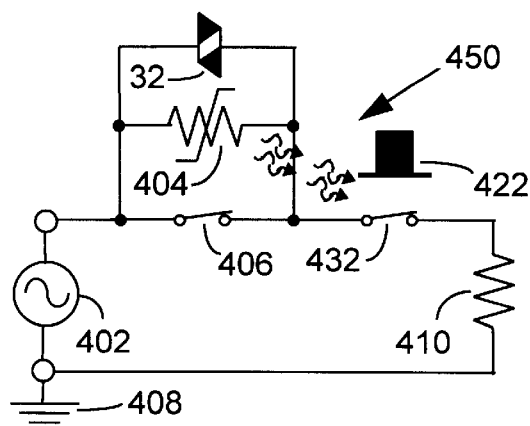

FIG. 6d shows an alternative arrangement to the circuit shown in FIG. 6c with a second PTC device 414 which is used to latch the series bimetal switch 412. Under normal current conditions, the series bimetal switch 412 connects the load 410 in the circuit. The parallel PTC device 404 and bimetal switch 406 operate as described above to reduce the current. The heat from the PTC device 404 trips the series bimetal switch 412 breaking the connection to the load 410 and closing the connection with the second PTC device 414. The heat from the second PTC device 414 latches open the series bimetal switch 412. In this circuit, the second PTC device 414 may also be a ceramic PTC or a constant wattage heater such as a resistor.

Figure 6F:
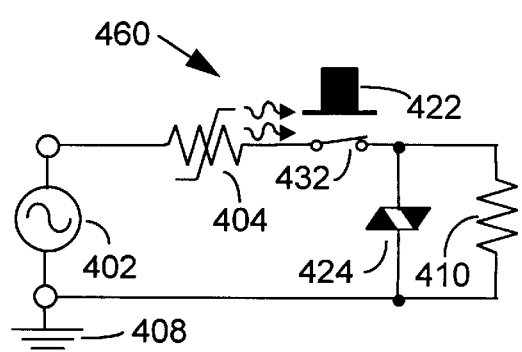

FIG. 6f shows an overcurrent protection circuit similar to that shown in FIG. 6b with a varistor 424 providing the additional capability to protect against overvoltages. For a short duration overvoltage, the varistor 424 absorbs the energy without damage. If the overvoltage is sustained, the current in the varistor 424 trips the PTC device 404 reducing the current to a very low value. The heat from the PTC device 404 trips the latching bimetal switch 432 which removes the voltage from the PTC device 404. This arrangement has several advantages. A small varistor 424 can be used to protect against sustained overvoltage faults, and the circuit can be latched open to protect against sustained overvoltages.

In the arrangements and embodiments of several aspects of this invention described above, the circuit components work together to provide overcurrent protection by accomplishing the functions of sensing the current, interrupting the current, limiting the energy transferred to the circuit, and, in some arrangements, isolating the circuit from the power source. The combination of PTC devices and mechanical switches can likewise be applied to circuit breakers and switches in general, and in a much simpler manner. For example, consider the circuit of FIG. 1c, with components having the voltage and current rating relationships described above. In a conventional circuit breaker, the signal to open is usually independent of the circuit being opened, and, at high voltage, is usually via a protection relay opening at low voltage from a potential transformer (PT) or a current transformer (CT). In a circuit breaker employing the arrangement shown in FIG. 1c, both mechanical switches 4,6 are opened simultaneously, with the second switch 6 connecting the PTC device 2 in series with the first switch 4. During the first half cycle the first switch 4 arcs until the zero crossing of the current cycle. During that time the PTC device increases in resistance and limits the current to a value that the second switch 6 can interrupt. The advantages of this combination are that the PTC device 2 is in the circuit for one half cycle, and thus need not endure a large voltage for a long period of time; the PTC device 2 does not actually trip the circuit and thus operation of the circuit breaker is not dependent upon the temperature of the PTC device 2 being precisely known or maintained; the resistance of the PTC device 2 in its low resistance state is not critical since the PTC device 2 is not in the circuit during normal operation; the PTC device 2 need only increase in resistance, by way of example, by 2 to 3 decades to limit the fault current by 2 to 3 decades; and the fault current interrupting requirements of the mechanical contacts 4,6, are reduced by 2 to 3 decades. While this arrangement requires two mechanical contacts 4,6 instead of one, the price of two low fault current contacts is a small fraction of one high fault current contact. The arrangement of FIG. 1c has been described in an application for use as a circuit breaker interrupting a fault current. The same arrangement can be used to advantage as a simple switch to switch normal currents thereby permitting the use of mechanical switches with lower current ratings than would otherwise be required. The operation of such a switch would be as described for that of a circuit breaker, except that the opening of the mechanical contacts 4,6 could be by manual activation as well as by electromechanical or other automatic means.

The following tables, with each keyed to a respective drawing FIG., list sample components which may be used in typical applications incorporating the overcurrent protection circuits of this invention. The corresponding reference numbers from the FIGS. are listed in the respective column headings of the various tables.

TABLE 1a

| Typical Application | Operating Voltage (volts) | Current (amps) | Max. Overcurrent (amps) | PTC Device (2) | PTC Max Voltage | PTC Hold Current | PTC Trip Current | Switch Device (4) | Switch Rating |
|---|---|---|---|---|---|---|---|---|---|
| Hair Dryer | 120 | 0–10 | <5000 | RUE900 | 30 | 9 | 18 | Relay Aromat JW | 10 amps 250 VAC |
| Electric Range | 220 | 0–10 | <5000 | RUE900 | 30 | 9 | 18 | Relay Aromat JW | 10 amps 250 VAC |
| Battery Pack | 9.5 | 0–2 | <500 | RUE250 | 30 | 2.5 | 5 | Relay Aromat TK | 2 amps 30 VDC |

TABLE 1b

| Typical Application | Operating Voltage (volts) | Current (amps) | Max. Overcurrent (amps) | PTC Device (2) | PTC Max Voltage | PTC Hold Current | PTC Trip Current | Switch Device (6) | Switch Rating |
|---|---|---|---|---|---|---|---|---|---|
| Electric Lawn Mower | 120 | 0–10 | <5000 | TR250-180 | 250 | 0.18 | 0.36 | Relay Aromat JW | 10 amps 250 VAC |
| Clothes Dryer | 220 | 0–10 | <5000 | TR250-180 | 250 | 0.18 | 0.36 | Relay Aromat JW | 10 amps 250 VAC |
| Cable Power System | 60 | 2 | <100 | RXE020 | 60 | 0.2 | 0.4 | Relay Aromat DS2E | 3 amps 250 VAC |
| Car Adapter Plug | 12 | 1 | <100 | RXE010 | 60 | 0.1 | 0.2 | Relay Aromat TQ | 1 amp 30 VDC |

TABLE 1c

| Typical Application | Operating Voltage (volts) | Current (amps) | Max. Overcurrent (amps) | PTC Device (2) | PTC Max Voltage | PTC Hold Current | PTC Trip Current | Switch Device (6) | Switch Rating | Switch Device (4) | Switch Rating |
|---|---|---|---|---|---|---|---|---|---|---|---|
| Toaster Oven | 120 | 0–10 | <5000 | RXE020 | 60 | 0.2 | 0.4 | Relay Aromat JW | 10 amps 250 VAC | Relay Aromat DS2 | 3 amps 250 VAC |
| UK Waffle Iron | 220 | 0–5 | <5000 | RXE020 | 60 | 0.2 | 0.4 | Relay Aromat JW | 10 amps 250 VAC | Relay Aromat DS2 | 3 amps 250 VAC |
| Cable Power System | 60 | 2 | <100 | RXE020 | 60 | 0.2 | 0.4 | Relay Aromat DS2E | 3 amps 250 VAC | Relay Aromat TQ | 1 amps 30 VDC |
| Boat Lights | 12 | 1 | <100 | RXE010 | 60 | 0.1 | 0.2 | Relay Aromat TQ | 1 amp 30 VDC | Relay Aromat TQ | 1 amp 30 VDC |

TABLE 3a

| Typical Application | Operating Voltage (volts) | Current (amps) | Max. Overcurrent (amps) | PTC Device (12) | PTC Max Voltage | PTC Hold Current | PTC Trip Current | Switch Device (14, 16, 18) | Switch Rating | Coil Voltage VDC | Resistor (Ohms) (22) | Diode Bridge (26) |
|---|---|---|---|---|---|---|---|---|---|---|---|---|
| Hair Dryer | 120 | 0–10 | <5000 | RUE900 | 30 | 9 | 18 | Relay RKS-11DX-12 | 10 amps 277 VAC | 12 | 2475 | GI 1A, 200V DF02M |
| UK Hair Dryer | 220 | 0–5 | <5000 | RUE500 | 30 | 5 | 10 | P&B RKS-11DX-12 | 10 amps 277 VAC | 12 | 4766 | GI 1A, 200V DF02M |
| Doorbell | 24 | 0–2 | <500 | RUE250 | 30 | 2.5 | 5 | Relay Aromat TK | 2 amps 30 VDC | 24 | 0 | GI 1A, 50V DF005M |
| Cable Power Supply | 90 | 0–3 | <40 | RUE500 | 30 | 5 | 10 | Aromat DS2E-S-DC48 | 3 amps 250 VAC | 48 | 10K | GI 1A, 100V DF01M |

TABLE 3a

| Typical Application | Coil Voltage VDC | Resistor (Ohms) (22) | Diode Bridge (26) |
|---|---|---|---|
| Hair Dryer | 12 | 2475 | GI 1A, 200V DF02M |
| UK Hair Dryer | 12 | 4766 | GI 1A, 200V DF02M |
| Doorbell | 24 | 0 | GI 1A, 50V DF005M |
| Cable Power Supply | 48 | 10K | GI 1A, 100V DF01M |

TABLE 3c

| Typical Application | Operating Voltage (volts) | Current (amps) | Max. Overcurrent (amps) | PTC Device (12) | PTC Max Voltage | PTC Hold Current | PTC Trip Current | Switch Device (14, 16, 18) | Switch Rating |
|---|---|---|---|---|---|---|---|---|---|
| Hair Dryer | 120 | 0–10 | <5000 | RUE900 | 30 | 9 | 18 | P&B RKS-11DX-12 | 10 amps 277 VAC |
| UK Electric Knife | 220 | 0–5 | <5000 | RUE500 | 30 | 5 | 10 | P&B RKS-11DX-12 | 10 amps 277 VAC |
| Doorbell | 24 | 0–2 | <500 | RUE250 | 30 | 2.5 | 5 | Relay Aromat TK | 2 amps 30 VDC |
| Cable Power Supply | 90 | 0–3 | <40 | RUE500 | 30 | 5 | 10 | Aromat DS2E-S-DC48 | 3 amps 250 VAC |

| Typical Application | Coil Voltage VDC | Resistor (Ohms) (22) | Diode Bridge (26) | Varistor or Tranzorb (32) |
|---|---|---|---|---|
| Hair Dryer | 12 | 2475 | GI 1A, 200V DF02M | Siemans S05K17 (27V) |
| UK Electric Knife | 12 | 4766 | GI 1A, 200V DF02M | Siemans S05K17 (27V) |
| Doorbell | 24 | 0 | GI 1A, 50V DF005M | NA |
| Cable Power Supply | 48 | 10K | GI 1A, 100V DF01M | GI P6KE27 (27V) |

TABLE 3d

| Typical Application | Operating Voltage (volts) | Current (amps) | Max. Overcurrent (amps) | PTC Device (12) | PTC Max Voltage | PTC Hold Current | PTC Trip Current | Switch Device (14, 16, 18) | Switch Rating |
|---|---|---|---|---|---|---|---|---|---|
| Cable Power Supply | 60 | 0–3 | <40 | RUE500 | 30 | 5 | 10 | Aromat DS2E-S-DC48 | 3 amps 250 VAC |

| Typical Application | Coil Voltage VDC | Resistor (Ohms) (22) | Diode Bridge (26) | Varistor or Tranzorb (32) |
|---|---|---|---|---|
| Cable Power Supply | 48 | 2880 | GI 1A, 200V DF02M | Siemans S05K17 (27V) |

TABLE 3e

| Typical Application | Operating Voltage (volts) | Current (amps) | Max. Overcurrent (amps) | PTC Device (12) | PTC Max Voltage | PTC Hold Current | PTC Trip Current | Switch Device (14, 16, 18) | Switch Rating |
|---|---|---|---|---|---|---|---|---|---|
| Cable Power Supply | 60 | 0–3 | <40 | RUE500 | 30 | 5 | 10 | Aromat DS2E-S-DC48 | 3 amps 250 VAC |

| Typical Application | | | | | Coil Voltage VDC | Resistor (Ohms) (22) | Varistor or Tranzorb (32) |
|---|---|---|---|---|---|---|---|
| Cable Power Supply | | | | | 48 | 2880 | GI P6KE27 (27V) |

TABLE 3f

| Typical Application | Operating Voltage (volts) | Current (amps) | Max. Overcurrent (amps) | PTC Device (12) | PTC Max Voltage | PTC Hold Current | PTC Trip Current | Switch Device (14, 16, 18) | Switch Rating |
|---|---|---|---|---|---|---|---|---|---|
| FAX Machine | 120 | 0–10 | <5000 | RUE900 | 30 | 9 | 18 | P&B RKS-5DG-24 | 10 amps 250 VAC |
| UK FAX Machine | 220 | 0–10 | <5000 | RUE900 | 30 | 9 | 18 | P&B RKS-5DG-24 | 10 amps 250 VAC |

| Typical Application | | | | | Coil Voltage VDC | Resistor (Ohms) (36) | Varistor or Tranzorb (26) |
|---|---|---|---|---|---|---|---|
| FAX Machine | | | | | 24 | 4400 | GI 1A, 200V DF02M |
| UK FAX Machine | | | | | 24 | 9000 | GI 1A, 200V DF02M |

TABLE 3g

| Typical Application | Operating Voltage (volts) | Current (amps) | Max. Overcurrent (amps) | PTC Device (12) | PTC Max Voltage | PTC Hold Current | PTC Trip Current | Switch Device (14, 16, 18) | Switch Rating |
|---|---|---|---|---|---|---|---|---|---|
| VCR | 120 | 0–10 | <5000 | RUE900 | 30 | 9 | 18 | Aromat JW 1FEN-DC24V | 10 amps 250 VAC |
| UK VCR | 220 | 0–10 | <5000 | RUE900 | 30 | 9 | 18 | Aromat JW 1FEN-DC24V | 10 amps 250 VAC |

| Typical Application | | | | | Coil Voltage VDC | Resistor (Ohms) (42) | Diode Bridge (26) | PTC Device (38) |
|---|---|---|---|---|---|---|---|---|
| FAX Machine | | | | | 24 | 4400 | GI 1A, 200V DF02M | Custom PPTC |
| UK FAX Machine | | | | | 24 | 9000 | GI 1A, 200V DF02M | Custom PPTC |

TABLE 4b

| Typical Application | Operating Voltage (volts) | Current (amps) | Max. Overcurrent (amps) | PTC Device (242) | PTC Max Voltage | PTC Hold Current | PTC Trip Current | Switch Device (200, 224, 226) | Switch Rating | Resistor (Ohms) (244) |
|---|---|---|---|---|---|---|---|---|---|---|
| GFI Plug | 120 | 0–10 | <5000 | RUE900 | 30 | 9 | 18 | Custom | 15 amps | 220 |
| UK GFI Plug | 220 | 0–10 | <5000 | RUE900 | 30 | 9 | 18 | Custom | 15 amps | 220 |

TABLE 5a,b

| Typical Application | Operating Voltage (volts) | Current (amps) | Max. Overcurrent (amps) | PTC Device (304) | PTC Max Voltage | PTC Hold Current | PTC Trip Current | Switch Device (306, 308) | Switch Rating |
|---|---|---|---|---|---|---|---|---|---|
| Domestic Breaker | 120 | 15/30 | 10000 | 2x RUE090 | 30 | 15 | 30 | Relay Aromat JW | 10 amps 250 VAC |
| Typical Application | Coil Zener Voltage VDC | Diodes (316, 318) | | | | | | | |
| FAX Machine | | | | | | | | | |

TABLE 6a

| Typical Application | Operating Voltage (volts) | Current (amps) | Max. Overcurrent (amps) | PTC Device (404) | PTC Max Voltage | PTC Hold Current | PTC Trip Current | Switch Device (406) | Switch Rating |
|---|---|---|---|---|---|---|---|---|---|
| Cable TV | 90 | 10 | 40 | BBR350 | 90 | 350 mA | 700 mA | TI 7AM205 Bimetal | 10 amps 110 VAC |

What is claimed is:

1. An electrical protection system which can be connected in series between an electrical power supply and an electrical load to form an operating circuit, and which when so connected protects the circuit from overcurrents, which system comprises:
   a. a control element which
      (1) has a relatively low resistance, $R_{LOW}$, when a relatively low current, $I_{NORMAL}$, is passing through it, and
      (2) is converted to a relatively high resistance, $R_{FAULT}$, when the current through it increases from $I_{NORMAL}$ to a relatively high current, $I_{FAULT}$;
   b. a circuit interruption element which
      (1) is connected in series with the control element,
      (2) has a normal state when the current $I_{NORMAL}$ is passing through the control element, the normal state permitting the current $I_{NORMAL}$ to pass through the system, and
      (3) has a fault state which permits the flow of at most a reduced current, substantially less than $I_{NORMAL}$; and
   c. a bypass element which
      (1) is connected in parallel with the series combination of the control element and the circuit interruption element,
      (2) is functionally linked to the circuit interruption element so that an increase in current passing through the bypass element can convert the circuit interruption element into the fault state, and
      (3) comprises
         (a) a relay coil which causes the circuit interruption element to move from its normal state to its fault state in response to increased current flowing in the bypass element,
         (b) a bypass resistor connected in series with the relay coil, and
         (c) a bypass switch which
            (i) is connected in series with the relay coil and in parallel with the bypass resistor, and
            (ii) is closed when the circuit switch is closed and open when the circuit switch is open;
   whereby, when the current through the system increases from $I_{NORMAL}$ to $I_{FAULT}$
   d. the resistance of the control element increases from $R_{LOW}$ to $R_{FAULT}$,
   e. an increased current passes through the bypass element, and
   f. the circuit interruption element is converted into the fault state.

2. A system according to claim 1 wherein the control element comprises a first PTC device.

3. A system according to claim 2 wherein the control element comprises a voltage clamping device connected in parallel with the first PTC device.

4. A system according to claim 1 wherein the circuit interruption element comprises a circuit switch having a normal state in which it is closed and a fault state in which it is open.

5. A system according to claim 1 wherein the bypass element comprises a PTC device, which
   a. is connected in series with the relay coil and the bypass resistor, and
   b. has a trip current which is less than the current which, when passed through the relay coil, will cause the circuit interruption element to change from its normal state to its fault state.

6. An electrical protection system which can be connected in series between an electrical power supply and an electrical load to form an operating circuit, and which when so connected protects the circuit from overcurrents, which system comprises:
   a. a control element which
      (1) has a relatively low resistance, $R_{LOW}$ when a relatively low current, $I_{NORMAL}$, is passing through it, and
      (2) is converted to a relatively high resistance, $R_{FAULT}$, when the current through it increases from $I_{NORMAL}$ to a relatively high current, $I_{FAULT}$;
   b. a circuit interruption element which
      (1) is connected in series with the control element,
      (2) has a normal state when the current $I_{NORMAL}$ is passing through the control element, the normal state permitting the current $I_{NORMAL}$ to pass through the system, and
      (3) has a fault state which permits the flow of at most a reduced current, substantially less than $I_{NORMAL}$;

c. a bypass element which
   (1) is connected in parallel with the series combination of the control element and the circuit interruption element, and
   (2) is functionally linked to the circuit interruption element so that an increase in current passing through the bypass element can convert the circuit interruption element into the fault state; and
d. an auxiliary double pole circuit switch and an auxiliary resistor,
   (1) the auxiliary double pole circuit switch
      (i) when the circuit interruption element is in its normal fault state connecting the load to the electrical power supply, and
      (ii) when the circuit interruption element is in its fault state disconnecting the load from the electrical power supply and connecting the auxiliary resistor to the electrical power supply, and
   (2) the auxiliary resistor having a resistance which is small enough to permit sufficient current to flow in the bypass element to maintain the circuit interruption element in its fault state;
whereby, when the current through the system increases from $I_{NORMAL}$ to $I_{FAULT}$
      (i) the resistance of the control element increases from $R_{LOW}$ to $R_{FAULT}$,
      (ii) an increased current passes through the bypass element and
      (iii) the circuit interruption element is converted into the fault state.

7. A circuit which comprises a power supply having a voltage $V_{NORMAL}$, an electrical load, and a protection system, and which circuit has a normal operating condition in which a normal current, $I_{NORMAL}$, passes through the protection system, which system comprises:
   a. a control element which
      (1) has a relatively low resistance, $R_{LOW}$, when a relatively low current, $I_{NORMAL}$, is passing through it, and
      (2) is converted to a relatively high resistance, $R_{FAULT}$, when the current through it increases from $I_{NORMAL}$ to a relatively high current, $I_{FAULT}$;
   b. a circuit interruption element, connected in series with the control element and having
      (1) a rating to carry a current, $I_{CARRY}$, which is greater than $I_{NORMAL}$,
      (2) a rating to interrupt a current, $I_{INTERRUPT}$, which is substantially less than $I_{FAULT}$, at a voltage equal to $V_{NORMAL}$,
      (3) a normal state when the current $I_{NORMAL}$ is passing through the control element, the normal state permitting the current $I_{NORMAL}$ to pass through the system, and
      (4) a fault state which permits the flow of at most a reduced current, substantially less than $I_{NORMAL}$; and
   c. a bypass element which
      (1) is connected in parallel with the series combination of the control element and the circuit interruption element,
      (2) is functionally linked to the circuit interruption element so that an increase in current passing through the bypass element can convert the circuit interruption element into the fault state, and
      (3) comprises
         (a) a relay coil which causes the circuit interruption element to move from its normal state to its fault state in response to increased current flowing in the bypass element,
         (b) a bypass resistor connected in series with the relay coil, and
         (c) a bypass switch which
            (i) is connected in series with the relay coil and in parallel with the bypass resistor, and
            (ii) is closed when the circuit interruption element is in its normal state and open when the circuit interruption element is in its fault state;
such that when the current in the protection system increases to $I_{FAULT}$, the resistance of the control element increases from $R_{LOW}$ to $R_{FAULT}$, an increased current passes through the bypass element, the circuit current is reduced below $I_{INTERRUPT}$, thereby permitting the circuit interruption element to convert to the fault state and interrupt circuit current.

8. An electrical protection system which can be connected between an electrical power supply and an electrical load to form an operating circuit, and which when so connected protects the circuit from overcurrents, which system comprises:
   a. a circuit interruption element having
      (1) a normal state which permits the flow of a normal current, $I_{NORMAL}$, and
      (2) a fault state which permits the flow of at most a reduced current, substantially less than $I_{NORMAL}$;
   b. a control element which
      (1) is connected in series with the circuit interruption element;
      (2) has a variable resistance which
         (a) is low compared to the load when the current in the circuit is the normal current, $I_{NORMAL}$, and
         (b) increases substantially when the current in the load substantially exceeds the normal current, $I_{NORMAL}$;
      (3) comprises a comparator which compares
         (a) the current, $I_{CONTROL}$, in the control element at a control comparison point, and
         (b) the current, $I_{LOAD}$, in the load at a load comparison point, and
      (4) changes the circuit interruption element from its normal state to its fault state when $I_{CONTROL}$ differs from $I_{LOAD}$ by more than a predetermined current imbalance value, $I_{DIFF}$; and
   c. a bypass element which
      (1) is connected in parallel with the control element, and
      (2) has a resistance such that
         (a) when the circuit current is $I_{NORMAL}$, the ratio of the resistance of the bypass element to the resistance of the control element is such that $I_{CONTROL}$ differs from $I_{LOAD}$ by less than $I_{DIFF}$, and
         (b) when the circuit current exceeds $I_{NORMAL}$ by a predetermined current amount, the ratio of the resistance of the bypass element to the resistance of the control element is such that $I_{CONTROL}$ differs from $I_{LOAD}$ by more than $I_{DIFF}$.

9. A system according to claim 8 wherein the control element comprises a PTC device.

10. A system according to claim 9 wherein the control element comprises a voltage clamping device connected in parallel with the PTC device.

11. A system according to claim 8 wherein the bypass element comprises a bypass resistor whose resistance is substantially independent of temperature.

12. A circuit which comprises a power supply having a voltage $V_{NORMAL}$, an electrical load, and a protection system, and which has a normal operating condition in which a normal current, $I_{NORMAL}$, passes through the protection system, which system comprises:

a. a circuit interruption element comprising a mechanical switch and having
  (1) a rating to carry a current, $I_{CARRY}$, which is greater than $I_{NORMAL}$,
  (2) a rating to interrupt a current, $I_{INTERRUPT}$, which is substantially less than a current, $I_{TRIP}$, at a voltage equal to $V_{NORMAL}$;
  (3) a normal state which permits the flow of a normal current, $I_{NORMAL}$, and
  (4) a fault state which permits the flow of at most a reduced current, substantially less than $I_{NORMAL}$;
b. a control element which
  (1) is connected in series with the circuit interruption element;
  (2) has a variable resistance which
    (a) is low compared to the load when the current in the circuit is the normal current, $I_{NORMAL}$, and
    (b) increases substantially when the current in the load exceeds a trip current, $I_{TRIP}$, which is greater than $I_{NORMAL}$,
  (3) comprises a comparator which compares
    (a) the current, $I_{CONTROL}$, in the control element at a control comparison point, and
    (b) the current, $I_{LOAD}$, in the load at a load comparison point, and
  (4) changes the circuit interruption element from its normal state to its fault state when $I_{CONTROL}$ differs from $I_{LOAD}$ by more than a predetermined current imbalance value, $I_{DIFF}$; and
c. a bypass element which
  (1) is connected in parallel with the control element, and
  (2) has a resistance such that
    (a) when the circuit current is $I_{NORMAL}$, the ratio of the resistance of the bypass element to the resistance of the control element is such that $I_{CONTROL}$ differs from $I_{LOAD}$ by less than $I_{DIFF}$, and
    (b) when the circuit current exceeds $I_{NORMAL}$ by a predetermined current amount, the ratio of the resistance of the bypass element to the resistance of the control element is such that $I_{CONTROL}$ differs from $I_{LOAD}$ by more than $I_{DIFF}$;
such that when the circuit current exceeds $I_{TRIP}$, the control element reduces the circuit current below $I_{INTERRUPT}$, thereby permitting the circuit interruption element to interrupt circuit current.

13. An electrical protection system which can be connected in series between an electrical power supply and an electrical load to form an operating circuit, and which when so connected protects the circuit from overcurrents, which system comprises:
  a. a circuit interruption element having
    (1) a normal state which permits the flow of a normal current, $I_{NORMAL}$, and
    (2) a fault state which permits the flow of at most a reduced current, substantially less than $I_{NORMAL}$; and
  b. a control element comprising
    (1) a PTC device which
      (a) is connected in series with the circuit interruption element, and
      (b) has a variable resistance which
        (i) is low compared to the load when the current is the normal current, $I_{NORMAL}$, and
        (ii) increases substantially when the current substantially exceeds the normal current, $I_{NORMAL}$,
    (2) a relay coil, coupled in parallel with the load, and
    (3) back-to-back coupled Zener diodes connected in parallel with the relay coil,
whereby when the voltage across the coupled Zener diodes exceeds a predetermined voltage amount current passes through the coupled Zener diodes thereby causing the current in the PTC device to increase by an amount sufficient to cause the resistance of the PTC device to increase by a predetermined resistance amount, which in turn causes the current through the relay coil to increase, thus changing the circuit interruption element from its normal state to its fault state.

14. A system according to claim 13 wherein the control element comprises a voltage clamping device connected in parallel with the PTC device.

15. An electrical protection system which can be connected between an electrical power supply and an electrical load to form an operating circuit, and which when so connected protects the circuit from overcurrents, which system comprises:
  a. a circuit interruption element which is a double pole circuit switch, and an auxiliary resistor, the double pole circuit switch having
    (1) a normal state which connects the load to the electrical power supply and permits the flow of a normal current, $I_{NORMAL}$, and
    (2) a fault state which disconnects the load from the electrical power supply and connects the auxiliary resistor to the electrical power supply;
  b. a control element
    (1) connected in series with the circuit interruption element, and
    (2) having a variable resistance which
      (a) is low compared to the load when the current is the normal current, $I_{NORMAL}$, and
      (b) increases a first predetermined resistance amount if the current substantially exceeds the normal current, $I_{NORMAL}$; and
  c. a bypass element
    (1) connected in parallel with the control element, and
    (2) having a resistance which
      (a) is substantially higher than the resistance of the control element when the circuit is in the normal operating condition,
      (b) is substantially lower than the resistance of the control element when the resistance of the control element has increased by the first predetermined resistance amount, and
      (c) increases by a second predetermined resistance amount when the resistance of the control element has increased by the first predetermined resistance amount;
with the double pole circuit switch changing from its normal state to its fault state when the resistance of the control element has increased by the first predetermined resistance amount and the resistance of the bypass element has increased by the second predetermined resistance amount.

16. A system according to claim 15 wherein the bypass element comprises a PTC device.

17. A system according to claim 16 wherein the bypass element comprises a voltage clamping device connected in parallel with the PTC device.

18. A system according to claim 15 wherein the auxiliary resistor is a PTC device.

19. A system according to claim 15 wherein the double pole circuit switch comprises a double pole bimetal switch which
  a. is thermally coupled with the bypass element so that when the resistance of the bypass element increases by the second predetermined resistance amount, heat generated by the bypass element causes the double pole bimetal switch to move from its normal state to its fault state; and b. is thermally coupled with the auxiliary resistor so that when the auxiliary resistor is connected to the electrical power supply, heat generated by the auxiliary resistor causes the double pole bimetal switch to latch in its fault state.

* * * * *

UNITED STATES PATENT AND TRADEMARK OFFICE

CERTIFICATE OF CORRECTION

PATENT NO. : 5,864,458

INVENTOR(S) : Duffy et al.

DATED : January 26, 1999

It is certified that error appears in the above-identified patent and that said Letters Patent is hereby corrected as shown below:

Column 1, line 16, after "and" insert --the disclosures of which--.

Column 5, line 62, delete "is".

Column 6, line 56, replace "had" by --made--.

Column 7, line 62, replace "1)" by --(1)--.

Column 8, line 67, after "device" insert --2--.

Column 10, line 5, after "than" insert --a--.

Column 15, line 42, replace "opens 412" by --412 opens--.

Col. 18 Table 1c, last column on the right, line 5 of data, replace "1 amps" by --1 amp".

Col. 18 Table 3a, "Switch Device (14,16,18)" column of table, line 1 of data, replace "Relay" by --P&B--.

UNITED STATES PATENT AND TRADEMARK OFFICE
CERTIFICATE OF CORRECTION

PATENT NO.     : 5,864,458

INVENTOR(S)   : Duffy et al.

DATED          : January 26, 1999

It is certified that error appears in the above-identified patent and that said Letters Patent is hereby corrected as shown below:

Table 3a, delete entire table in Column 19. *[It is a repeat of the last 3 columns from Table 3a in Columns 17 and 18.]*

Col. 22 Table 3f, last column on right, replace column header "Varistor or Tranzorb (26)" by --Diode Bridge (26)--.

Table 3g, "Typical Application" column, replace "FAX Machine" and "UK FAX Machine" by --VCR-- and --UK VCR-- respectively.

Col. 24 Claim 6, line 33, After "normal" delete "fault".

Col. 24 Claim 6, line 36, replace "state" by --state,--.

Col. 24 Claim 13, line 24, replace "amount" by --amount,--.

Col. 24 Claim 13, line 25, replace "diodes" by --diodes,--.

Signed and Sealed this

Twenty-seventh Day of July, 1999

*Attest:*

Q. TODD DICKINSON

*Attesting Officer*     *Acting Commissioner of Patents and Trademarks*